US012713064B2

(12) United States Patent
Schwarz et al.

(10) Patent No.: US 12,713,064 B2
(45) Date of Patent: Aug. 18, 2026

(54) PATCH CREATION AND SIGNALING FOR V3C DYNAMIC MESH COMPRESSION

(71) Applicant: Nokia Technologies Oy, Espoo (FI)

(72) Inventors: Sebastian Schwarz, Munich (DE); Lauri Ilola, Tampere (FI); Christoph Bachhuber, Munich (DE); Lukasz Kondrad, Munich (DE)

(73) Assignee: Nokia Technologies Oy, Espoo (FI)

( * ) Notice: Subject to any disclaimer, the term of this patent is extended or adjusted under 35 U.S.C. 154(b) by 90 days.

(21) Appl. No.: 18/580,767

(22) PCT Filed: Jul. 15, 2022

(86) PCT No.: PCT/IB2022/056517
§ 371 (c)(1),
(2) Date: Jan. 19, 2024

(87) PCT Pub. No.: WO2023/002315
PCT Pub. Date: Jan. 26, 2023

(65) Prior Publication Data

US 2024/0406440 A1 Dec. 5, 2024

Related U.S. Application Data

(60) Provisional application No. 63/224,111, filed on Jul. 21, 2021.

(51) Int. Cl.
*H04N 19/597* (2014.01)
*G06T 9/00* (2006.01)
*H04N 19/46* (2014.01)

(52) U.S. Cl.
CPC .......... *H04N 19/597* (2014.11); *G06T 9/001* (2013.01); *H04N 19/46* (2014.11)

(58) Field of Classification Search
CPC ....... H04N 19/597; H04N 19/46; G06T 9/001
See application file for complete search history.

(56) References Cited

U.S. PATENT DOCUMENTS 11,202,098 B2 * 12/2021 Mammou .............. H04N 19/59
2018/0268570 A1 * 9/2018 Budagavi ............... G06T 9/001
(Continued)

FOREIGN PATENT DOCUMENTS

EP 3543958 A1 9/2019
WO WO-2019162567 A1 * 8/2019 .............. G06T 9/00
(Continued)

OTHER PUBLICATIONS

"Information technology—Coded Representation of Immersive Media—Part 5: Video-based Point Cloud Compression", ISO/IEC 23090-5, 2019, 102 pages.
(Continued)

*Primary Examiner* — Tat C Chio
(74) *Attorney, Agent, or Firm* — McCarter & English, LLP.; Joseph C. Drish

(57) ABSTRACT

A method includes receiving a parameterized mesh, the mesh defining a shape and attributes of an object in three-dimensional space; compressing the mesh to generate a two-dimensional patch of the mesh; and signaling at least one of: projection plane changes within the patch to support patches wrapping around a three-dimensional model; separation of attribute and geometry patch level of detail scaling to support at least one high resolution attribute patch alongside at least one lower resolution geometry patch, reflecting at least one feature of at least one lower vertex count mesh; or separation of attribute and geometry patch orientation for image packing.

18 Claims, 18 Drawing Sheets

(56) References Cited

U.S. PATENT DOCUMENTS

| | | | | |
|---|---|---|---|---|
| 2019/0110041 | A1 | 4/2019 | Cole et al. | |
| 2019/0122393 | A1 | 4/2019 | Sinharoy et al. | |
| 2019/0164351 | A1 | 5/2019 | Kim et al. | |
| 2020/0013235 | A1* | 1/2020 | Tsai | H04N 19/597 |
| 2020/0219286 | A1* | 7/2020 | Sinharoy | G06T 7/174 |
| 2021/0090301 | A1* | 3/2021 | Mammou | H04N 19/20 |

FOREIGN PATENT DOCUMENTS

| | | | |
|---|---|---|---|
| WO | 2021/136876 | A1 | 7/2021 |
| WO | 2021/136878 | A1 | 7/2021 |

OTHER PUBLICATIONS

"Polygon mesh", Wikipedia, Retrieved on Feb. 29, 2024, Webpage available at : https://en.wikipedia.org/wiki/Polygon_mesh.

"CC BY-SA 3.0 DEED", creativecommons, Retrieved on Feb. 29, 2024, Webpage available at : https://creativecommons.org/licenses/by-sa/3.0/.

"Skinning", Inria, Retrieved on Feb. 29, 2024, Webpage available at: https://people.rennes.inria.fr/Ludovic.Hoyet/teaching/IMO/05_IMO2016_Skinning.pdf.

"V-PCC Codec Description", WG 7, ISO/IEC JTC 1/SC 29/WG 7 N00012, Oct. 2020, 73 pages.

"Information technology—Coded Representation of Immersive Media—Part 5: Visual Volumetric Video-based Coding (V3C) and Video-based Point Cloud Compression (V-PCC)", N00065, ISO/IEC 23090-5, 2021, 370 pages.

Faramarzi et al., "[V-PCC] EE2.6 Report on mesh coding with V-PCC", Samsung Electronics, ISO/IEC JTC1/SC29/WG11 MPEG2019 m49588, Jul. 2019, 7 pages.

"google / draco", github, Retrieved on Feb. 29, 2024, Webpage available at : https://github.com/google/draco.

Chen et al., "Local resampling for patch-based texture synthesis in vector fields", International Journal of Computer Applications in Technology, vol. 38, No. 1/2/3, Jul. 19, 2010, pp. 124-133.

Rhyu et al., "[V-PCC] [New Proposal] V-PCC extension for mesh coding", Samsung Electronics, ISO/IEC JTC1/SC29/WG11 m47608, Mar. 2019, 3 pages.

International Search Report and Written Opinion received for corresponding Patent Cooperation Treaty Application No. PCT/IB2022/056517, dated Oct. 20, 2022, 17 pages.

Kuma et al., "PCC TMC2 with additional projection plane", Sony corporation, ISO/IEC JTC1/SC29/WG11 MPEG2018/m43494, Jul. 2018, 10 pages.

Sinharoy et al., "[V-PCC] [New proposal] Patch Splitting", Samsung Electronics, ISO/IEC JTC1/SC29/WG11 MPEG2020/m52487, Jan. 2020, 7 pages.

* cited by examiner

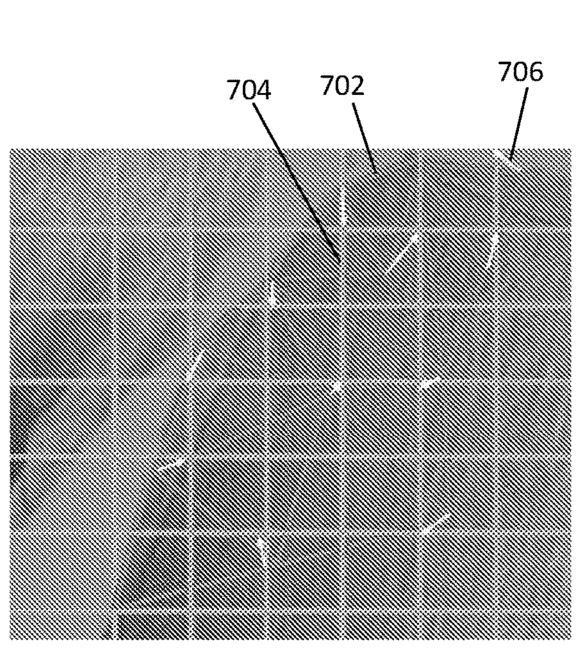
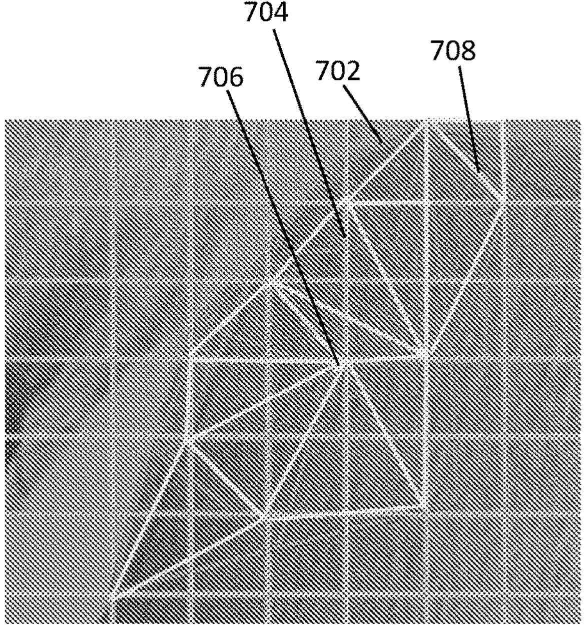
FIG. 7

802

| patch_data_unit( tileID, patchIdx ) { | **Descriptor** |
|---|---|
| **pdu_2d_pos_x**[ tileID ][ patchIdx ] | ue(v) |
| **pdu_2d_pos_y**[ tileID ][ patchIdx ] | ue(v) |
| **pdu_2d_size_x_minus1**[ tileID ][ patchIdx ] | ue(v) |
| **pdu_2d_size_y_minus1**[ tileID ][ patchIdx ] | ue(v) |
| **pdu_3d_offset_u**[ tileID ][ patchIdx ] | u(v) |
| **pdu_3d_offset_v**[ tileID ][ patchIdx ] | u(v) |
| **pdu_3d_offset_d**[ tileID ][ patchIdx ] | u(v) |
| if( asps_normal_axis_max_delta_value_enabled_flag ) | |
| **pdu_3d_range_d**[ tileID ][ patchIdx ] | u(v) |
| **pdu_projection_id**[ tileID ][ patchIdx ] | u(v) |
| **pdu_projection_id_change_flag**[ tileID ][ patchIdx ] | u(1) |
| if( pdu_projection_id_change_flag ) { | |
| **pdu_projection_id_change_direction**[ tileID ][ patchIdx ] | u(2) |
| **pdu_projection_id_change_step_size** [ tileID ][ patchIdx ] | u(1) |
| **pdu_projection_id_change_step_direction** [ tileID ][ patchIdx ] | u(1) |
| **pdu_projection_id_change_step_count** [ tileID ][ patchIdx ] | ue(v) |
| for( i = 0; i < pdu_projection_id_change_step_count [ tileID ][ patchIdx ] + 1; i++ ) { | |
| **pdu_projection_id_change_step** [ tileID ][ patchIdx ] | ue(v) |
| } | |
| } | |
| **pdu_orientation_index**[ tileID ][ patchIdx ] | u(v) |
| if( afps_lod_mode_enabled_flag ) { | |
| **pdu_lod_enabled_flag**[ tileID ][ patchIdx ] | u(1) |
| if( pdu_lod_enabled_flag[ tileID ][ patchIdx ] ) { | |
| **pdu_lod_scale_x_minus1**[ tileID ][ patchIdx ] | ue(v) |
| **pdu_lod_scale_y_idc**[ tileID ][ patchIdx ] | ue(v) |
| } | |
| } | |
| if( asps_plr_enabled_flag ) | |
| plr_data( tileID, patchIdx ) | |
| if( asps_miv_extension_present_flag ) | |
| pdu_miv_extension( tileID, patchIdx ) /* Specified in ISO/IEC 23090-12 */ | |
| } | |

FIG. 8

| patch_data_unit( tileID, patchIdx ) { | **Descriptor** |
|---|---|
| **pdu_2d_pos_x**[ tileID ][ patchIdx ] | ue(v) |
| **pdu_2d_pos_y**[ tileID ][ patchIdx ] | ue(v) |
| **pdu_2d_size_x_minus1**[ tileID ][ patchIdx ] | ue(v) |
| **pdu_2d_size_y_minus1**[ tileID ][ patchIdx ] | ue(v) |
| **pdu_3d_offset_u**[ tileID ][ patchIdx ] | u(v) |
| **pdu_3d_offset_v**[ tileID ][ patchIdx ] | u(v) |
| **pdu_3d_offset_d**[ tileID ][ patchIdx ] | u(v) |
| if( asps_normal_axis_max_delta_value_enabled_flag ) | |
| **pdu_3d_range_d**[ tileID ][ patchIdx ] | u(v) |
| **pdu_projection_id**[ tileID ][ patchIdx ] | u(v) |
| **pdu_projection_id_change_flag**[ tileID ][ patchIdx ] | u(1) |
| if( pdu_projection_id_change_flag ) { | |
| **pdu_projection_id_change_step_direction** [ tileID ][ patchIdx ] | u(1) |
| **pdu_projection_id_change_step_count** [ tileID ][ patchIdx ] | ue(v) |
| for( i = 0; i < pdu_projection_id_change_step_count [ tileID ][ patchIdx ] + 1; i++ ) { | |
| **pdu_projection_id_change_step** [ tileID ][ patchIdx ] | ue(v) |
| **pdu_projection_id**[ tileID ][ patchIdx ] [i] | u(v) |
| } | |
| } | |
| **pdu_orientation_index**[ tileID ][ patchIdx ] | u(v) |
| if( afps_lod_mode_enabled_flag ) { | |
| **pdu_lod_enabled_flag**[ tileID ][ patchIdx ] | u(1) |
| if( pdu_lod_enabled_flag[ tileID ][ patchIdx ] ) { | |
| **pdu_lod_scale_x_minus1**[ tileID ][ patchIdx ] | ue(v) |
| **pdu_lod_scale_y_idc**[ tileID ][ patchIdx ] | ue(v) |
| } | |
| } | |
| if( asps_plr_enabled_flag ) | |
| plr_data( tileID, patchIdx ) | |
| if( asps_miv_extension_present_flag ) | |
| pdu_miv_extension( tileID, patchIdx ) /* Specified in ISO/IEC 23090-12 */ | |
| } | |

| patch_data_unit( tileID, patchIdx ) { | **Descriptor** |
|---|---|
| **pdu_2d_pos_x**[ tileID ][ patchIdx ] | ue(v) |
| **pdu_2d_pos_y**[ tileID ][ patchIdx ] | ue(v) |
| **pdu_2d_size_x_minus1**[ tileID ][ patchIdx ] | ue(v) |
| **pdu_2d_size_y_minus1**[ tileID ][ patchIdx ] | ue(v) |
| **pdu_3d_offset_u**[ tileID ][ patchIdx ] | u(v) |
| **pdu_3d_offset_v**[ tileID ][ patchIdx ] | u(v) |
| **pdu_3d_offset_d**[ tileID ][ patchIdx ] | u(v) |
| if( asps_normal_axis_max_delta_value_enabled_flag ) | |
| **pdu_3d_range_d**[ tileID ][ patchIdx ] | u(v) |
| **pdu_projection_id**[ tileID ][ patchIdx ] | u(v) |
| **pdu_projection_id_change_flag**[ tileID ][ patchIdx ] | u(1) |
| if( pdu_projection_id_change_flag ) { | |
| **pdu_projection_id_change_step_direction** [ tileID ][ patchIdx ] | u(1) |
| **pdu_projection_id_change_step_count** [ tileID ][ patchIdx ] | ue(v) |
| for( i = 0; i < pdu_projection_id_change_step_count [ tileID ][ patchIdx ] + 1; i++ ) { | |
| **pdu_projection_id_change_step** [ tileID ][ patchIdx ] | ue(v) |
| **pdu_projection_id**[ tileID ][ patchIdx ] [i] | u(v) |
| **pdu_3d_offset_u**[ tileID ][ patchIdx ] [i] | u(v) |
| **pdu_3d_offset_v**[ tileID ][ patchIdx ] [i] | u(v) |
| **pdu_3d_offset_d**[ tileID ][ patchIdx ] [i] | u(v) |
| if( asps_normal_axis_max_delta_value_enabled_flag ) | |
| **pdu_3d_range_d**[ tileID ][ patchIdx ] [i] | u(v) |
| } | |
| } | |
| **pdu_orientation_index**[ tileID ][ patchIdx ] | u(v) |
| if( afps_lod_mode_enabled_flag ) { | |
| **pdu_lod_enabled_flag**[ tileID ][ patchIdx ] | u(1) |
| if( pdu_lod_enabled_flag[ tileID ][ patchIdx ] ) { | |
| **pdu_lod_scale_x_minus1**[ tileID ][ patchIdx ] | ue(v) |
| **pdu_lod_scale_y_idc**[ tileID ][ patchIdx ] | ue(v) |
| } | |
| } | |
| if( asps_plr_enabled_flag ) | |
| plr_data( tileID, patchIdx ) | |
| if( asps_miv_extension_present_flag ) | |
| pdu_miv_extension( tileID, patchIdx ) /* Specified in ISO/IEC 23090-12 */ | |
| } | |

| patch_data_unit( tileID, patchIdx ) { | **Descriptor** |
|---|---|
| **pdu_2d_pos_x**[ tileID ][ patchIdx ] | ue(v) |
| **pdu_2d_pos_y**[ tileID ][ patchIdx ] | ue(v) |
| **pdu_2d_size_x_minus1**[ tileID ][ patchIdx ] | ue(v) |
| **pdu_2d_size_y_minus1**[ tileID ][ patchIdx ] | ue(v) |
| **pdu_3d_offset_u**[ tileID ][ patchIdx ] | u(v) |
| **pdu_3d_offset_v**[ tileID ][ patchIdx ] | u(v) |
| | |
| if( asps_normal_axis_max_delta_value_enabled_flag ) | |
| **pdu_3d_range_d**[ tileID ][ patchIdx ] | u(v) |
| **pdu_projection_id**[ tileID ][ patchIdx ] | u(v) |
| **pdu_orientation_index**[ tileID ][ patchIdx ] | u(v) |
| if( afps_lod_mode_enabled_flag ) { | |
| **pdu_lod_enabled_flag**[ tileID ][ patchIdx ] | u(1) |
| if( pdu_lod_enabled_flag[ tileID ][ patchIdx ] ) { | |
| **pdu_lod_seperated_flag** [ tileID ][ patchIdx ] | u(1) |
| **pdu_lod_scale_x_minus1**[ tileID ][ patchIdx ] | ue(v) |
| **pdu_lod_scale_y_idc**[ tileID ][ patchIdx ] | ue(v) |
| if( pdu_lod_enabled_flag[ tileID ][ patchIdx ] ) { | |
| **pdu_lod_seperated_flag** [ tileID ][ patchIdx ] | u(1) |
| **pdu_lod_scale_tex_x_minus1**[ tileID ][ patchIdx ] | ue(v) |
| **pdu_lod_scale_tex_y_idc**[ tileID ][ patchIdx ] | ue(v) |
| } | |
| } | |
| } | |
| if( asps_plr_enabled_flag ) | |
| plr_data( tileID, patchIdx ) | |
| if( asps_miv_extension_present_flag ) | |
| pdu_miv_extension( tileID, patchIdx ) /* Specified in ISO/IEC 23090-12 */ | |
| } | |

| patch_data_unit( tileID, patchIdx ) { | **Descriptor** |
|---|---|
| **pdu_2d_pos_x**[ tileID ][ patchIdx ] | ue(v) |
| **pdu_2d_pos_y**[ tileID ][ patchIdx ] | ue(v) |
| **pdu_2d_size_x_minus1**[ tileID ][ patchIdx ] | ue(v) |
| **pdu_2d_size_y_minus1**[ tileID ][ patchIdx ] | ue(v) |
| **pdu_3d_offset_u**[ tileID ][ patchIdx ] | u(v) |
| **pdu_3d_offset_v**[ tileID ][ patchIdx ] | u(v) |
| **pdu_3d_offset_d**[ tileID ][ patchIdx ] | u(v) |
| if( asps_normal_axis_max_delta_value_enabled_flag ) | |
| **pdu_3d_range_d**[ tileID ][ patchIdx ] | u(v) |
| **pdu_projection_id**[ tileID ][ patchIdx ] | u(v) |
| **pdu_orientation_index**[ tileID ][ patchIdx ] | u(v) |
| **pdu_orientation_seperated_flag** [ tileID ][ patchIdx ] | u(1) |
| if( **pdu_orientation_seperated_flag**) | |
| **pdu_orientation_tex_index**[ tileID ][ patchIdx ] | u(v) |
| if( afps_lod_mode_enabled_flag ) { | |
| **pdu_lod_enabled_flag**[ tileID ][ patchIdx ] | u(1) |
| if( pdu_lod_enabled_flag[ tileID ][ patchIdx ] ) { | |
| **pdu_lod_scale_x_minus1**[ tileID ][ patchIdx ] | ue(v) |
| **pdu_lod_scale_y_idc**[ tileID ][ patchIdx ] | ue(v) |
| } | |
| } | |
| if( asps_plr_enabled_flag ) | |
| plr_data( tileID, patchIdx ) | |
| if( asps_miv_extension_present_flag ) | |
| pdu_miv_extension( tileID, patchIdx ) /* Specified in ISO/IEC 23090-12 */ | |
| } | |

PATCH CREATION AND SIGNALING FOR V3C DYNAMIC MESH COMPRESSION

RELATED APPLICATIONS

This application claims priority to PCT Application No. PCT/IB2022/056517, filed on Jul. 15, 2022, which claims priority to U.S. Provisional Application No. 63/224,111, filed on Jul. 21, 2021, each of which is incorporated herein by reference in its entirety.

TECHNICAL FIELD

The examples and non-limiting embodiments relate generally to volumetric video coding, and more particularly, to patch creation and signaling for V3C dynamic mesh compression.

BACKGROUND

It is known to perform video coding and decoding.

SUMMARY

In accordance with an embodiment, a method includes receiving a parameterized mesh, the mesh defining a shape and attributes of an object in three-dimensional space; compressing the mesh to generate a two-dimensional patch of the mesh; and signaling at least one of: projection plane changes within the patch to support patches wrapping around a three-dimensional model; separation of attribute and geometry patch level of detail scaling to support at least one high resolution attribute patch alongside at least one lower resolution geometry patch, reflecting at least one feature of at least one lower vertex count mesh; or separation of attribute and geometry patch orientation for image packing.

In accordance with an embodiment, a method includes receiving a compressed parameterized mesh, the mesh defining a shape and attributes of an object in three-dimensional space; decompressing the mesh from a two-dimensional patch of the mesh; and receiving signaling of at least one of: projection plane changes within the patch to support patches wrapping around a three-dimensional model; separation of attribute and geometry patch level of detail scaling to support at least one high resolution attribute patch alongside at least one lower resolution geometry patch, reflecting at least one embodiment of at least one lower vertex count mesh; or separation of attribute and geometry patch orientation for image packing.

In accordance with an embodiment, a method includes receiving a parameterized mesh, the mesh defining a shape and attributes of an object in three-dimensional space; generating vertex coordinates, vertex attributes, and vertex connectivity from the mesh; encoding the vertex coordinates and vertex attributes to generate encoded vertex coordinates and encoded vertex attributes; encoding the vertex connectivity with an ordering of the encoded vertex coordinates to generate encoded vertex connectivity and auxiliary data; multiplexing the encoded vertex coordinates, encoded vertex attributes and encoded vertex connectivity and auxiliary data to generate a compressed output bitstream comprising the parameterized mesh; and wherein the output bitstream is compressed via generating a two-dimensional patch of the mesh via generating a texture patch from a texture map and face information within the mesh, to determine texture coordinates of vertices on the texture map, and generating a geometry patch using the texture coordinates, to determine a subsampling factor for a geometry map.

In accordance with an embodiment, a method includes receiving a compressed bitstream comprising an input mesh; receiving signaling of at least one of: projection plane changes within a patch to support patches wrapping around a three-dimensional model; separation of attribute and geometry patch level of detail to support at least one high resolution attribute patch alongside at least one lower resolution geometry patch; or separation of attribute and geometry patch orientation for image packing; deriving vertex connectivity and auxiliary data from the bitstream; decoding the vertex connectivity and auxiliary data to generate decoded vertex connectivity; decoding the bitstream to generate decoded vertex attributes and reconstructed vertex coordinates; and multiplexing the decoded vertex attributes, reordered vertex coordinates, and the decoded vertex connectivity to generate an output mesh as a reconstruction of the input mesh.

In accordance with an embodiment, an apparatus includes at least one processor; and at least one non-transitory memory including computer program code; wherein the at least one memory and the computer program code are configured to, with the at least one processor, cause the apparatus at least to: receive a parameterized mesh, the mesh defining a shape and attributes of an object in three-dimensional space; compress the mesh to generate a two-dimensional patch of the mesh; and signal at least one of: projection plane changes within the patch to support patches wrapping around a three-dimensional model; separation of attribute and geometry patch level of detail scaling to support at least one high resolution attribute patch alongside at least one lower resolution geometry patch, reflecting at least one feature of at least one lower vertex count mesh; or separation of attribute and geometry patch orientation for image packing.

In accordance with an embodiment, an apparatus includes at least one processor; and at least one non-transitory memory including computer program code; wherein the at least one memory and the computer program code are configured to, with the at least one processor, cause the apparatus at least to: receive a compressed parameterized mesh, the mesh defining a shape and attributes of an object in three-dimensional space; decompress the mesh from a two-dimensional patch of the mesh; and receive signaling of at least one of: projection plane changes within the patch to support patches wrapping around a three-dimensional model; separation of attribute and geometry patch level of detail scaling to support at least one high resolution attribute patch alongside at least one lower resolution geometry patch, reflecting at least one feature of at least one lower vertex count mesh; or separation of attribute and geometry patch orientation for image packing.

In accordance with an embodiment, an apparatus includes at least one processor; and at least one non-transitory memory including computer program code; wherein the at least one memory and the computer program code are configured to, with the at least one processor, cause the apparatus at least to: receive a parameterized mesh, the mesh defining a shape and attributes of an object in three-dimensional space; generate vertex coordinates, vertex attributes, and vertex connectivity from the mesh; encode the vertex coordinates and vertex attributes to generate encoded vertex coordinates and encoded vertex attributes; encode the vertex connectivity with an ordering of the encoded vertex coordinates to generate encoded vertex connectivity and auxiliary data; multiplex the encoded vertex coordinates, encoded vertex attributes and encoded vertex connectivity and auxiliary data to generate a compressed output bitstream comprising the parameterized mesh; and wherein the output bitstream is compressed via generating a two-dimensional patch of the mesh via generating a texture patch from a texture map and face information within the mesh, to determine texture coordinates of vertices on the texture map, and generating a geometry patch using the texture coordinates, to determine a subsampling factor for a geometry map.

In accordance with an embodiment, an apparatus includes at least one processor; and at least one non-transitory memory including computer program code; wherein the at least one memory and the computer program code are configured to, with the at least one processor, cause the apparatus at least to: receive a compressed bitstream comprising an input mesh; receive signaling of at least one of: projection plane changes within a patch to support patches wrapping around a three-dimensional model; separation of attribute and geometry patch level of detail to support at least one high resolution attribute patch alongside at least one lower resolution geometry patch; or separation of attribute and geometry patch orientation for image packing; derive vertex connectivity and auxiliary data from the bitstream; decode the vertex connectivity and auxiliary data to generate decoded vertex connectivity; decode the bitstream to generate decoded vertex attributes and reconstructed vertex coordinates; and multiplex the decoded vertex attributes, reordered vertex coordinates, and the decoded vertex connectivity to generate an output mesh as a reconstruction of the input mesh.

In accordance with an embodiment, an apparatus includes means for receiving a parameterized mesh, the mesh defining a shape and attributes of an object in three-dimensional space; means for compressing the mesh to generate a two-dimensional patch of the mesh; and means for signaling at least one of: projection plane changes within the patch to support patches wrapping around a three-dimensional model; separation of attribute and geometry patch level of detail scaling to support at least one high resolution attribute patch alongside at least one lower resolution geometry patch, reflecting at least one embodiment of at least one lower vertex count mesh; or separation of attribute and geometry patch orientation for image packing.

In accordance with an embodiment, an apparatus includes means for receiving a compressed parameterized mesh, the mesh defining a shape and attributes of an object in three-dimensional space; means for decompressing the mesh from a two-dimensional patch of the mesh; and means for receiving signaling of at least one of: projection plane changes within the patch to support patches wrapping around a three-dimensional model; separation of attribute and geometry patch level of detail scaling to support at least one high resolution attribute patch alongside at least one lower resolution geometry patch, reflecting at least one embodiment of at least one lower vertex count mesh; or separation of attribute and geometry patch orientation for image packing.

In accordance with an embodiment, an apparatus includes means for receiving a parameterized mesh, the mesh defining a shape and attributes of an object in three-dimensional space; means for generating vertex coordinates, vertex attributes, and vertex connectivity from the mesh; means for encoding the vertex coordinates and vertex attributes to generate encoded vertex coordinates and encoded vertex attributes; means for encoding the vertex connectivity with an ordering of the encoded vertex coordinates to generate encoded vertex connectivity and auxiliary data; means for multiplexing the encoded vertex coordinates, encoded vertex attributes and encoded vertex connectivity and auxiliary data to generate compressed output bitstream comprising the parameterized mesh; and wherein the output bitstream is compressed via generating a two-dimensional patch of the mesh via generating a texture patch from a texture map and face information within the mesh, to determine texture coordinates of vertices on the texture map, and generating a geometry patch using the texture coordinates, to determine a subsampling factor for a geometry map.

In accordance with an embodiment, an apparatus includes means for receiving a compressed bitstream comprising an input mesh; means for receiving signaling of at least one of: projection plane changes within a patch to support patches wrapping around a three-dimensional model; separation of attribute and geometry patch level of detail to support at least one high resolution attribute patch alongside at least one lower resolution geometry patch; or separation of attribute and geometry patch orientation for image packing; means for deriving vertex connectivity and auxiliary data from the bitstream; means for decoding the vertex connectivity and auxiliary data to generate decoded vertex connectivity; means for decoding the bitstream to generate decoded vertex attributes and reconstructed vertex coordinates; and means for multiplexing the decoded vertex attributes, reordered vertex coordinates, and the decoded vertex connectivity to generate an output mesh as a reconstruction of the input mesh.

In accordance with an embodiment, a non-transitory program storage device readable by a machine, tangibly embodying a program of instructions executable by the machine for performing operations is provided, the operations comprising receiving a parameterized mesh, the mesh defining a shape and attributes of an object in three-dimensional space; compressing the mesh to generate a two-dimensional patch of the mesh; and signaling at least one of: projection plane changes within the patch to support patches wrapping around a three-dimensional model; separation of attribute and geometry patch level of detail scaling to support at least one high resolution attribute patch alongside at least one lower resolution geometry patch, reflecting at least one embodiment of at least one lower vertex count mesh; or separation of attribute and geometry patch orientation for image packing.

In accordance with an embodiment, a non-transitory program storage device readable by a machine, tangibly embodying a program of instructions executable by the machine for performing operations is provided, the operations comprising receiving a compressed parameterized mesh, the mesh defining a shape and attributes of an object in three-dimensional space; decompressing the mesh from a two-dimensional patch of the mesh; and receiving signaling of at least one of: projection plane changes within the patch to support patches wrapping around a three-dimensional model; separation of attribute and geometry patch level of detail scaling to support at least one high resolution attribute patch alongside at least one lower resolution geometry patch, reflecting at least one embodiment of at least one lower vertex count mesh; or separation of attribute and geometry patch orientation for image packing.

In accordance with an embodiment, a non-transitory program storage device readable by a machine, tangibly embodying a program of instructions executable by the machine for performing operations is provided, the operations comprising receiving a parameterized mesh, the mesh defining a shape and attributes of an object in three-dimensional space; generating vertex coordinates, vertex attributes, and vertex connectivity from the mesh; encoding the vertex coordinates and vertex attributes to generate encoded vertex coordinates and encoded vertex attributes; encoding the vertex connectivity with an ordering of the encoded vertex coordinates to generate encoded vertex connectivity and auxiliary data; multiplexing the encoded vertex coordinates, encoded vertex attributes and encoded vertex connectivity and auxiliary data to generate a compressed output bitstream comprising the parameterized mesh; and wherein the output bitstream is compressed via generating a two-dimensional patch of the mesh via generating a texture patch from a texture map and face information within the mesh, to determine texture coordinates of vertices on the texture map, and generating a geometry patch using the texture coordinates, to determine a subsampling factor for a geometry map.

In accordance with an embodiment, a non-transitory program storage device readable by a machine, tangibly embodying a program of instructions executable by the machine for performing operations is provided, the operations comprising: receiving a compressed bitstream comprising an input mesh; receiving signaling of at least one of: projection plane changes within a patch to support patches wrapping around a three-dimensional model; separation of attribute and geometry patch level of detail to support at least one high resolution attribute patch alongside at least one lower resolution geometry patch; or separation of attribute and geometry patch orientation for image packing; deriving vertex connectivity and auxiliary data from the bitstream; decoding the vertex connectivity and auxiliary data to generate decoded vertex connectivity; decoding the bitstream to generate decoded vertex attributes and reconstructed vertex coordinates; and multiplexing the decoded vertex attributes, reordered vertex coordinates, and the decoded vertex connectivity to generate an output mesh as a reconstruction of the input mesh.

In accordance with an embodiment, an apparatus includes at least one processor; and at least one memory including computer program code; wherein the at least one memory and the computer program code are configured to, with the at least one processor, cause the apparatus at least to: receive as an input a parameterized mesh; and generate a two-dimensional patch from the parameterized mesh; wherein generating the two-dimensional patch from the parameterized mesh comprises generating at least one texture patch from a texture map and face information, and generating at least one geometry patch.

BRIEF DESCRIPTION OF THE DRAWINGS

The foregoing embodiments and other features are explained in the following description, taken in connection with the accompanying drawings, wherein:

FIG. 7 shows an example of geometry grid subsampling and resulting vertex texture errors.

FIG. 8 shows an embodiment where changes in dominant projection direction are signaled in steps, after a certain number of geometry values (pixel positions) and following a certain orientation and direction.

FIG. 9 shows an embodiment where changes in dominant projection direction are signaled explicitly, after a certain number of geometry values (pixel positions), and following a certain orientation and direction.

FIG. 10 shows an embodiment where changes in dominant projection direction), as well as patch 3D metadata, are signaled explicitly, after a certain number of geometry values (pixel positions), and following a certain orientation and direction.

FIG. 11 shows signaling that supports the separation of texture and geometry LOD scaling per patch.

FIG. 12 shows signaling that supports the separation of texture and geometry patch orientation.

DETAILED DESCRIPTION OF EXAMPLE EMBODIMENTS

Figure 1:
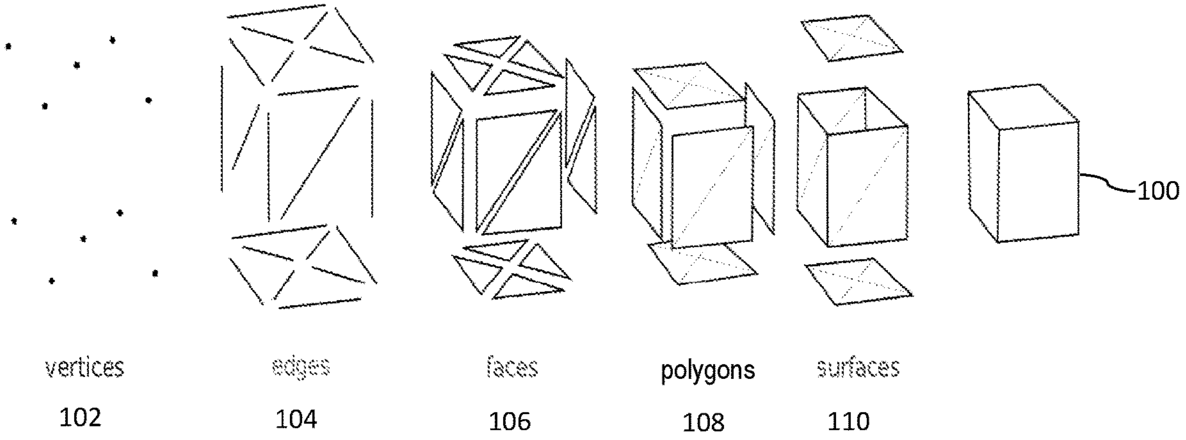
FIG. 1 shows elements used for mesh representations.

The examples described herein relate to the encoding and decoding of digital volumetric video.

Volumetric Video Data

Volumetric video data represents a three-dimensional scene or object and can be used as input for AR, VR and MR applications. Such data describes geometry (shape, size, position in 3D-space) and respective attributes (e.g. color, opacity, reflectance, . . . ), plus any possible temporal changes of the geometry and attributes at given time instances (like frames in 2D video). Volumetric video is either generated from 3D models, e.g., CGI, or captured from real-world scenes using a variety of capture solutions, e.g. multi-camera, laser scan, combination of video and dedicated depth sensors, and more. Also, a combination of CGI and real-world data is possible. Typical representation formats for such volumetric data are triangle meshes, point clouds, or voxel. Temporal information about the scene can be included in the form of individual capture instances, e.g., "frames" in 2D video, or other means, e.g. position of an object as a function of time.

Because volumetric video describes a 3D scene (or object), such data can be viewed from any viewpoint. Therefore, volumetric video is an important format for any AR, VR, or MR applications, especially for providing 6DOF viewing capabilities.

Increasing computational resources and advances in 3D data acquisition devices has enabled reconstruction of highly detailed volumetric video representations of natural scenes. Infrared, lasers, time-of-flight and structured light are all examples of devices that can be used to construct 3D video data. Representation of the 3D data depends on how the 3D data is used. Dense Voxel arrays have been used to represent volumetric medical data. In 3D graphics, polygonal meshes are extensively used. Point clouds on the other hand are well suited for applications such as capturing real world 3D scenes where the topology is not necessarily a 2D manifold. Another way to represent 3D data is coding this 3D data as set of texture and depth map as is the case in the multi-view plus depth. Closely related to the techniques used in multi-view plus depth is the use of elevation maps, and multi-level surface maps.

Compression of Volumetric Video Data

In dense point clouds or voxel arrays, the reconstructed 3D scene may include tens or even hundreds of millions of points. When such representations are to be stored or interchanged between entities, then efficient compression becomes essential. Standard volumetric video representation formats, such as point clouds, meshes, voxel, suffer from poor temporal compression performance. Identifying correspondences for motion-compensation in 3D-space is an ill-defined problem, as both, geometry and respective attributes may change. For example, temporal successive "frames" do not necessarily have the same number of meshes, points or voxel. Therefore, compression of dynamic 3D scenes is inefficient. 2D-video based approaches for compressing volumetric data, e.g., multiview+depth, have much better compression efficiency, but rarely cover the full scene. Therefore, they provide only limited 6DOF capabilities.

Instead of the above-mentioned approach, a 3D scene, represented as meshes, points, and/or voxel, can be projected onto one, or more, geometries. These geometries are "unfolded" onto 2D planes (two planes per geometry: one for texture, one for depth), which are then encoded using standard 2D video compression technologies. Relevant projection geometry information is transmitted alongside the encoded video files to the decoder. The decoder decodes the video and performs the inverse projection to regenerate the 3D scene in any desired representation format (not necessarily the starting format).

Projecting volumetric models onto 2D planes allows for using standard 2D video coding tools with highly efficient temporal compression. Thus, coding efficiency is increased greatly. Using geometry-projections instead of prior-art 2D-video based approaches, e.g., multiview+depth, provide a better of the scene (or object). Thus, 6DOF capabilities are improved. Using several geometries for individual objects improves the coverage of the scene further. Furthermore, standard video encoding hardware can be utilized for real-time compression/decompression of the projected planes. The projection and reverse projection steps are of low complexity

3D Meshes

A polygon mesh is a collection of vertices, edges and faces that defines the shape of a polyhedral object in 3D computer graphics and solid modeling. The faces usually consist of triangles (triangle mesh), quadrilaterals (quads), or other simple convex polygons (n-gons), since this simplifies rendering, but may also be more generally composed of concave polygons, or even polygons with holes.

With reference to FIG. 1, objects 100 created with polygon meshes are represented by different types of elements. These include vertices 102, edges 104, faces 106, polygons 108 and surfaces 110 as shown in FIG. 1. In many applications, only vertices 102, edges 104 and either faces 106 or polygons 108 are stored. FIG. 1 thus shows elements necessary for mesh representations.

Polygon meshes are defined by the following elements:

Vertex: A position in 3D space defined as (x,y,z) along with other information such as color (r,g,b), normal vector and texture coordinates.

Edge: A connection between two vertices.

Face: A closed set of edges, in which a triangle face has three edges, and a quad face has four edges. A polygon is a coplanar set of faces. In systems that support multi-sided faces, polygons and faces are equivalent. Mathematically a polygonal mesh may be considered an unstructured grid, or undirected graph, with additional properties of geometry, shape and topology.

Surfaces: or smoothing groups, are useful, but not required to group smooth regions.

Groups: Some mesh formats include groups, which define separate elements of the mesh, and are useful for determining separate sub-objects for skeletal animation or separate actors for non-skeletal animation.

Materials: defined to allow different portions of the mesh to use different shaders when rendered.

UV coordinates: Most mesh formats also support some form of UV coordinates which are a separate 2D representation of the mesh "unfolded" to show what portion of a 2-dimensional texture map to apply to different polygons of the mesh. It is also possible for meshes to include other such vertex attribute information such as color, tangent vectors, weight maps to control animation, etc. (sometimes also called channels).

Compared to 3D point clouds transmitted using V-PCC, a differentiating factor is the additional connectivity information in form of "edges".

More background on skinned mesh animation can be found here: https://people.rennes.inria.fr/Ludovic.Hoyet/teaching/IMO/05_IMO2016_Skinning.pdf (last accessed Jun. 16, 2021).

MPEG Video-Based Point Cloud Coding (V-PCC)

V3C/V-PCC enables the encoding and decoding processes of a variety of volumetric media by using video and image coding technologies. This is achieved through first a conversion of such media from their corresponding 3D representation to multiple 2D representations, also referred to as V3C components in the specification, before coding such information. Such representations may include the occupancy, geometry, and attribute components. The occupancy component can inform a V3C decoding and/or rendering system of which samples in the 2D components are associated with data in the final 3D representation. The geometry component includes information about the precise location of 3D data in space, while attribute components can provide additional properties, e.g. texture or material information, of such 3D data.

Additional information that allows associating all these subcomponents and enables the inverse reconstruction, from a 2D representation back to a 3D representation is also included in a special component, referred to as atlas. An atlas consists of multiple elements, named as patches. Each patch identifies a region in all available 2D components and includes information necessary to perform the appropriate inverse projection of this region back to the 3D space. The shape of such regions is determined through a 2D bounding box associated with each patch as well as their coding order. The shape of these regions is also further refined after the consideration of the occupancy information.

Atlases are partitioned into patch packing blocks of equal size. The 2D bounding boxes of patches and their coding order determine the mapping between the blocks of the image and the patch indices.

Figure 2:
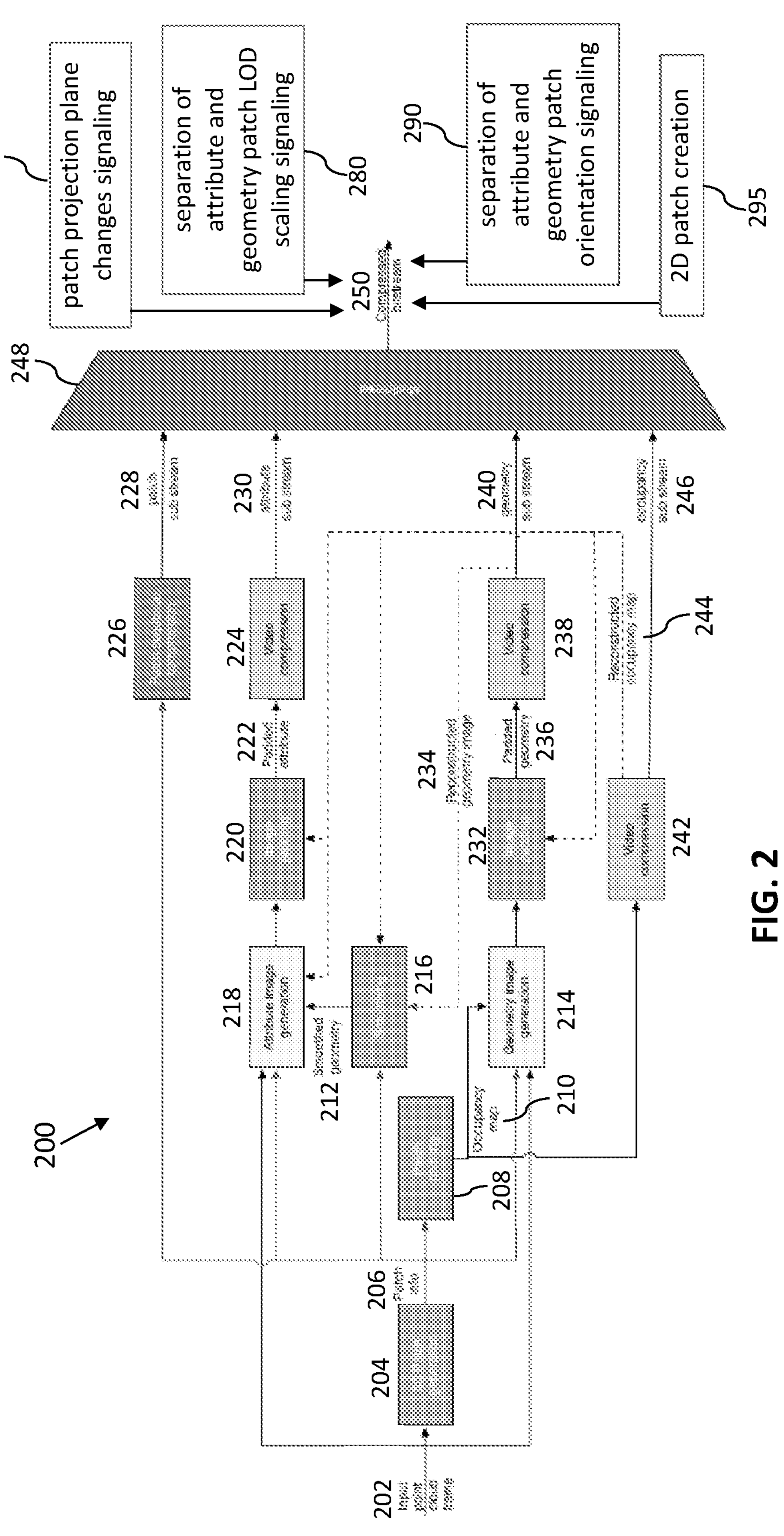
FIG. 2 shows an example V-PCC encoding process/apparatus, based on the embodiments described herein.
Figure 3:
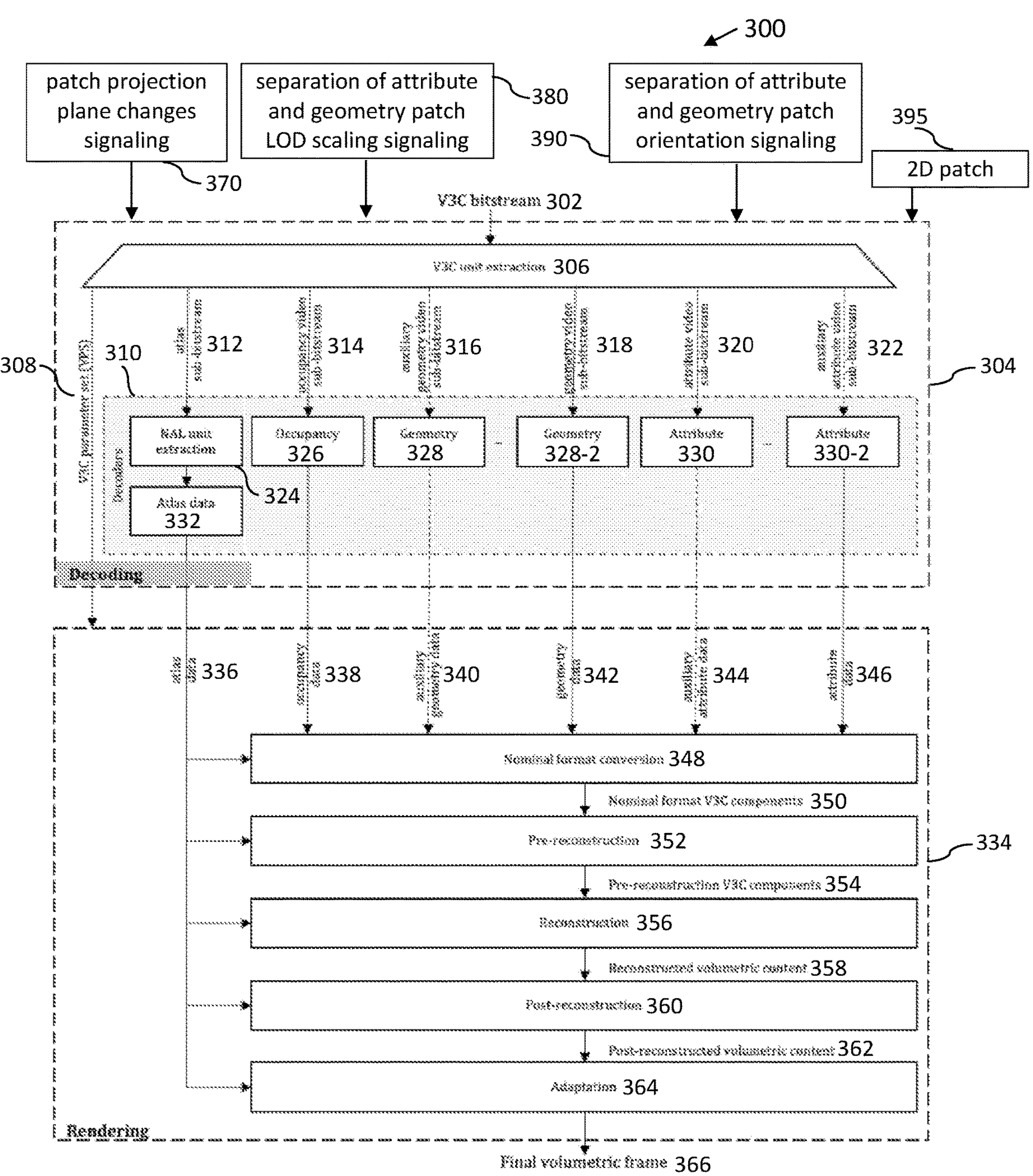
FIG. 3 shows an example V-PCC decoding process/apparatus, based on the embodiments described herein.

FIG. 2 and FIG. 3 show an example encoding process/apparatus 200 and an example decoding process/apparatus 300, respectively.

As shown in FIG. 2, an input point cloud frame 202 is provided as input to a 3D patch generation process 204. The input point cloud frame 202 is provided to attribute image generation 218 and to geometry image generation 214. The 3D patch generation operation 204 generates patch information 206, and the patch information 206 is provided as input to patch packing 208, to smoothing 216, to geometry image generation 214, to attribute image generation 218, and to patch sequence compression 226. The patch packing operation 208 generates an occupancy map 210, which occupancy map 210 and/or other output from the patch packing 208 is provided to geometry image generation 214 and to video compression 242.

Smoothing 216 generates a smoothed geometry 212 which is provided as input to attribute image generation 218. The output of attribute image generation 218 is provided as input to image padding 220. Image padding 220 generates a padded attribute 222 which is provided as input to video compression 224. Patch sequence compression 226 generates a patch sub stream 228 that is provided as input to multiplexer 248, and the video compression 224 generates an attribute sub stream 230 that is provided as input to the multiplexer 248.

The output of the geometry image generation 214 is provided to image padding 232. Image padding 232 generates a padded geometry 236 which is provided as input to video compression 238. Video compression 238 generates a geometry sub stream 240 that is provided as input to the multiplexer 248. Video compression 242 generates an occupancy sub stream 246 that is provided as input to the multiplexer 248. Video compression 242 optionally generates a reconstructed occupancy map 244 that is optionally provided as input to image padding 232, to smoothing 216, to attribute image generation 218 and to image padding 220. Video compression 238 optionally generates a reconstructed geometry image 234 that is optionally provided as input to smoothing 216. The multiplexer 248 uses the patch sub stream 228, the attribute sub stream 230, the geometry sub stream 240, and the occupancy sub stream 246 to generate the compressed bitstream 250. The compressed bitstream 250 comprises a compressed version of the input point cloud frame 202.

Based on the examples described herein, as shown in FIG. 2, the encoding process/apparatus 200 of FIG. 2 may be extended such that the encoding process/apparatus 200 signals projection plane changes 270, separation of attribute and geometry patch LOD scaling 280, and/or separation of attribute and geometry patch orientation 290. The projection plane changes signaling 270 signals changes within a patch to support patches wrapping around a 3D model. The separation of attribute and geometry patch LOD scaling signaling 280 supports high resolution attribute patches alongside lower resolution geometry patches, reflecting the nature of lower vertex count meshes. The separation of attribute and geometry patch orientation signaling 290 is for image packing (pdu_orientation_index) to improve video codec efficiency. Signaling 270, 280, and/or 290 may be a part of the compressed bitstream 250. Alternatively, signaling 270, signaling 280, and/or signaling 290 may be provided and signaled separately from the compressed bitstream 250.

Based on the examples described herein, as shown in FIG. 2, the encoding process/apparatus 200 of FIG. 2 may be extended such that the encoding process/apparatus 200 generates a 2D patch with operation 295. The 2D patch created using operation 295 may be provided within the compressed bitstream 250, or the 2D patch created using operation 295 may be signaled separately to a decoder.

As shown in FIG. 3, the V3C bitstream 302 is provided as input to a decoder 304 or decoding process 304. The V3C bitstream 302 of FIG. 3 may for example comprise or be the compressed bitstream 250 generated from the encoding process/apparatus 200 shown in FIG. 2. The V3C bitstream 302 is provided as input to V3C unit extraction 306. The V3C unit extraction 306 extracts different types of information that is then provided as input to several decoders 310 comprised of NAL unit extraction 324, occupancy 326, geometry 328, geometry 328-2, attribute 330, attribute 330-2, and atlas data 332. In particular, the V3C unit extraction 306 provides an atlas sub-bitstream 312 to NAL unit extraction 324, an occupancy video sub-bitstream 314 to occupancy 326, an auxiliary geometry video sub-bitstream 316 to geometry 328, a geometry video sub-bitstream 318 to geometry 328-2, an attribute video sub-bitstream 320 to attribute 330, and an auxiliary attribute video sub-bitstream 322 to attribute 330-2. The NAL unit extraction 324 generates an output that is provided to the atlas data decoder 332.

As further shown in FIG. 3, the V3C unit extraction 306 generates and provides a V3C parameter set (VPS) 308 to rendering 334. Atlas data decoder 332 generates and provides atlas data 336 as an input to nominal format conversion 348, occupancy decoder 326 generates and provides occupancy data 338 to nominal format conversion 348, geometry decoder 328 generates and provides auxiliary geometry data 340 to nominal format conversion 348, geometry decoder 328-2 generates and provides geometry data 342 to nominal format conversion 348, attribute decoder 330 generates and provides auxiliary attribute data 344 to nominal format conversion 348, and attribute decoder 330-2 generates and provides attribute data 346 to nominal format conversion 348.

As further shown in FIG. 3 rendering 334 is comprised of nominal format conversion 348, pre-reconstruction 352, reconstruction 356, post-reconstruction 360, and adaptation 364. The atlas data decoder 332 generates and provides atlas data 336 as an input also to pre-reconstruction 352, reconstruction 356, post-reconstruction 360 and adaptation 364. Nominal format conversion 348 generates nominal format V3C components 350 that is provided as input to pre-reconstruction 352. Pre-reconstruction 352 generates and provides pre-reconstruction V3C components 354 to reconstruction 356. Reconstruction 356 generates and provides reconstructed volumetric content 358 to post-reconstruction 360. Post-reconstruction 360 generates and provides post-reconstructed volumetric content 362 to adaptation 364. Adaptation 364 generates the final volumetric frame 366.

Based on the examples described herein, as shown in FIG. 3, the decoding process/apparatus 300 of FIG. 3 may be extended such that the decoding process/apparatus 300 receives signaling of projection plane changes 370, separation of attribute and geometry patch LOD scaling 380, and/or separation of attribute and geometry patch orientation 390. The projection plane changes signaling 370 signals changes within a patch to support patches wrapping around a 3D model. The separation of attribute and geometry patch LOD scaling signaling 380 supports high resolution attribute patches alongside lower resolution geometry patches, reflecting the nature of lower vertex count meshes. The separation of attribute and geometry patch orientation signaling 390 is for image packing (pdu_orientation_index) to improve video codec efficiency. Signaling 370, 380, and/or 390 may be a part of the VC3 bitstream 302 or compressed bitstream 250. Alternatively, signaling 370, signaling 380, and/or signaling 390 may be received and signaled separately from the VC3 bitstream 302 or compressed bitstream 250 and in that case, the signaling 370/380/390 may in some examples be provided to the decoding 304.

As further shown in FIG. 3, the decoding process/apparatus 300 of FIG. 3 may be extended such that the decoding process/apparatus 300 receives a 2D patch 395 that has been created using the process described herein. The 2D patch 395 may be provided within V3C bitstream 302 or compressed bitstream 250, or the 2D patch 395 may be provided to decoding 304 separately. The decoder 300 may also be configured to create the 2D patch 395.

V3C bitstream 302 is composed of a collection of V3C components, such as atlas, occupancy, geometry, and attributes. Furthermore, to provide additional functionalities and similar flexibility as available in many video specifications, the atlas component may be divided into tiles and is encapsulated into NAL units.

A V3C bitstream 302 consists of one or more coded V3C sequences (CVS). A CVS starts with a V3C parameter set (VPS) 308, included in at least one V3C unit or provided through external means, and includes one or more V3C units. Each V3C unit can be identified by v3c_unit_type syntax element of V3C unit header syntax structure. V3C unit types are listed in ISO/IEC 23090-5:2020:Table 2.

V3C Metadata Related Background

V3C metadata is included in atlas_sub_bistream( ) which may include a sequence of NAL units including header and payload data. nal_unit_header( ) is used define how to process the payload data. NumBytesInNalUnit specifies the size of the NAL unit in bytes. This value is required for decoding of the NAL unit. Some form of demarcation of NAL unit boundaries is necessary to enable inference of NumBytesInNalUnit. One such demarcation method is specified in Annex C (23090-5) for the sample stream format.

V3C atlas coding layer (ACL) is specified to efficiently represent the content of the patch data. The NAL is specified to format that data and provide header information in a manner appropriate for conveyance on a variety of communication channels or storage media. All data are included in NAL units, each of which includes an integer number of bytes. A NAL unit specifies a generic format for use in both packet-oriented and bitstream systems. The format of NAL units for both packet-oriented transport and sample streams is identical except that in the sample stream format specified in Annex C (23090-5) each NAL unit can be preceded by an additional element that specifies the size of the NAL unit.

In the nal_unit_header( ) syntax nal_unit_type specifies the type of the RBSP data structure included in the NAL unit as specified in Table 7 3 of 23090-5. nal_layer_id specifies the identifier of the layer to which an ACL NAL unit belongs or the identifier of a layer to which a non-ACL NAL unit applies. The value of nal_layer_id shall be in the range of 0 to 62, inclusive. The value of 63 may be specified in the future by ISO/IEC. Decoders conforming to a profile specified in Annex A of the current version of 23090-5 shall ignore (e.g., remove from the bitstream and discard) all NAL units with values of nal_layer_id not equal to 0.

rbsp_byte[i] is the i-th byte of an RBSP. An RBSP is specified as an ordered sequence of bytes as follows:

The RBSP includes a string of data bits (SODB) as follows (1-2):

1. When the SODB is empty (e.g., zero bits in length), the RBSP is also empty.
2. Otherwise, the RBSP includes the SODB as follows (i-iii):

i. The first byte of the RBSP includes the first (most significant, left-most) eight bits of the SODB; the next byte of the RBSP includes the next eight bits of the SODB, etc., until fewer than eight bits of the SODB remain.

ii. The rbsp_trailing_bits( ) syntax structure is present after the SODB as (most follows: The first significant, left-most) bits of the final RBSP byte include the remaining bits of the SODB (if any). The next bit consists of a single bit equal to 1 (e.g., rbsp_stop_one_bit). When the rbsp_stop_one_bit is not the last bit of a byte-aligned byte, one or more bits equal to 0 (e.g., instances of rbsp_alignment_zero_bit) are present to result in byte alignment.

iii. One or more cabac_zero_word 16-bit syntax elements equal to 0x0000 may be present in some RBSPs after the rbsp_trailing_bits( ) at the end of the RBSP.

Syntax structures having these RBSP properties are denoted in the syntax tables using an "_rbsp" suffix. These structures are carried within NAL units as the content of the rbsp_byte[i] data bytes. As an example, typical content includes:

atlas_sequence_parameter_set_rbsp( ), which is used to carry parameters related to a sequence of V3C frames.

atlas_frame_parameter_set_rbsp( ), which is used to carry parameters related to a specific frame. Can be applied for a sequence of frames as well.

sei_rbsp( ), used to carry SEI messages in NAL units.

atlas_tile_group_layer_rbsp( ), used to carry patch layout information for tile groups.

When the boundaries of the RBSP are known, the decoder can extract the SODB from the RBSP by concatenating the bits of the bytes of the RBSP and discarding the rbsp_stop_one_bit, which is the last (least significant, right-most) bit equal to 1, and discarding any following (less significant, farther to the right) bits that follow it, which are equal to 0. The data necessary for the decoding process is included in the SODB part of the RBSP.

atlas_tile_group_laye_rbsp( ) includes metadata information for a list off tile groups, which represent sections of frame. Each tile group may include several patches for which the metadata syntax is described below in Table 1.

TABLE 1

| Path metadata syntax | |
|---|---|
| | Descriptor |
| patch_data_unit( patchIdx ) { | |
| pdu_2d_pos_x[ patchIdx ] | u(v) |

TABLE 1-continued

Path metadata syntax

| | Descriptor |
|---|---|
| pdu_2d_pos_y[ patchIdx ] | u(v) |
| pdu_2d_delta_size_x[ patchIdx ] | se(v) |
| pdu_2d_delta_size_y[ patchIdx ] | se(v) |
| pdu_3d_pos_x[ patchIdx ] | u(v) |
| pdu_3d_pos_y[ patchIdx ] | u(v) |
| pdu_3d_pos_min_z[ patchIdx ] | u(v) |
| if( asps_normal_axis_max_delta_value_enabled_flag ) | |
| pdu_3d_pos_delta_max_z[ patchIdx ] | u(v) |
| pdu_projection_id[ patchIdx ] | u(v) |
| pdu_orientation_index[ patchIdx ] | u(v) |
| if( afps_lod_mode_enabled_flag ) { | |
| pdu_lod_enabled_flag[ patchIndex ] | u(1) |
| if( pdu_lod_enabled_flag[ patchIndex ] > 0 ) { | |
| pdu_lod_scale_x_minus1[ patchIndex ] | ue(v) |
| pdu_lod_scale_y[ patchIndex ] | ue(v) |
| } | |
| } | u(v) |
| if( asps_point_local_reconstruction_enabled_flag ) | |
| point_local_reconstruction_data( patchIdx ) | |
| } | |

Annex F of V3C V-PCC specification (23090-5) describes different SEI messages that have been defined for V3C MIV purposes. SEI messages assist in processes related to decoding, reconstruction, display, or other purposes. Annex F (23090-5) defines two types of SEI messages: essential and non-essential. V3C SEI messages are signaled in sei_rspb( ) which is documented below in Table 2.

TABLE 2

SEI message metadata syntax

| | Descriptor |
|---|---|
| sei_rbsp( ) { | |
| do | |
| sei_message( ) | |
| while( more_rbsp_data( ) ) | |
| rbsp_trailing_bits( ) | |
| } | |

Non-essential SEI messages are not required by the decoding process. Conforming decoders are not required to process this information for output order conformance.

Specification for presence of non-essential SEI messages is also satisfied when those messages (or some subset of them) are conveyed to decoders (or to the HRD) by other means not specified in V3C V-PCC specification (23090-5). When present in the bitstream, non-essential SEI messages shall obey the syntax and semantics as specified in Annex F (23090-5). When the content of a non-essential SEI message is conveyed for the application by some means other than presence within the bitstream, the representation of the content of the SEI message is not required to use the same syntax specified in annex F (23090-5). For the purpose of counting bits, only the appropriate bits that are actually present in the bitstream are counted.

Essential SEI messages are an integral part of the V-PCC bitstream and should not be removed from the bitstream. The essential SEI messages are categorized into two types:

Type-A essential SEI messages: These SEIs include information required to check bitstream conformance and for output timing decoder conformance. Every V-PCC decoder conforming to point A should not discard any relevant Type-A essential SEI messages and shall consider them for bitstream conformance and for output timing decoder conformance.

Type-B essential SEI messages: V-PCC decoders that wish to conform to a particular reconstruction profile should not discard any relevant Type-B essential SEI messages and shall consider them for 3D point cloud reconstruction and conformance purposes.

V-PCC Mesh Coding Extension (MPEG M49588)

Figure 4:
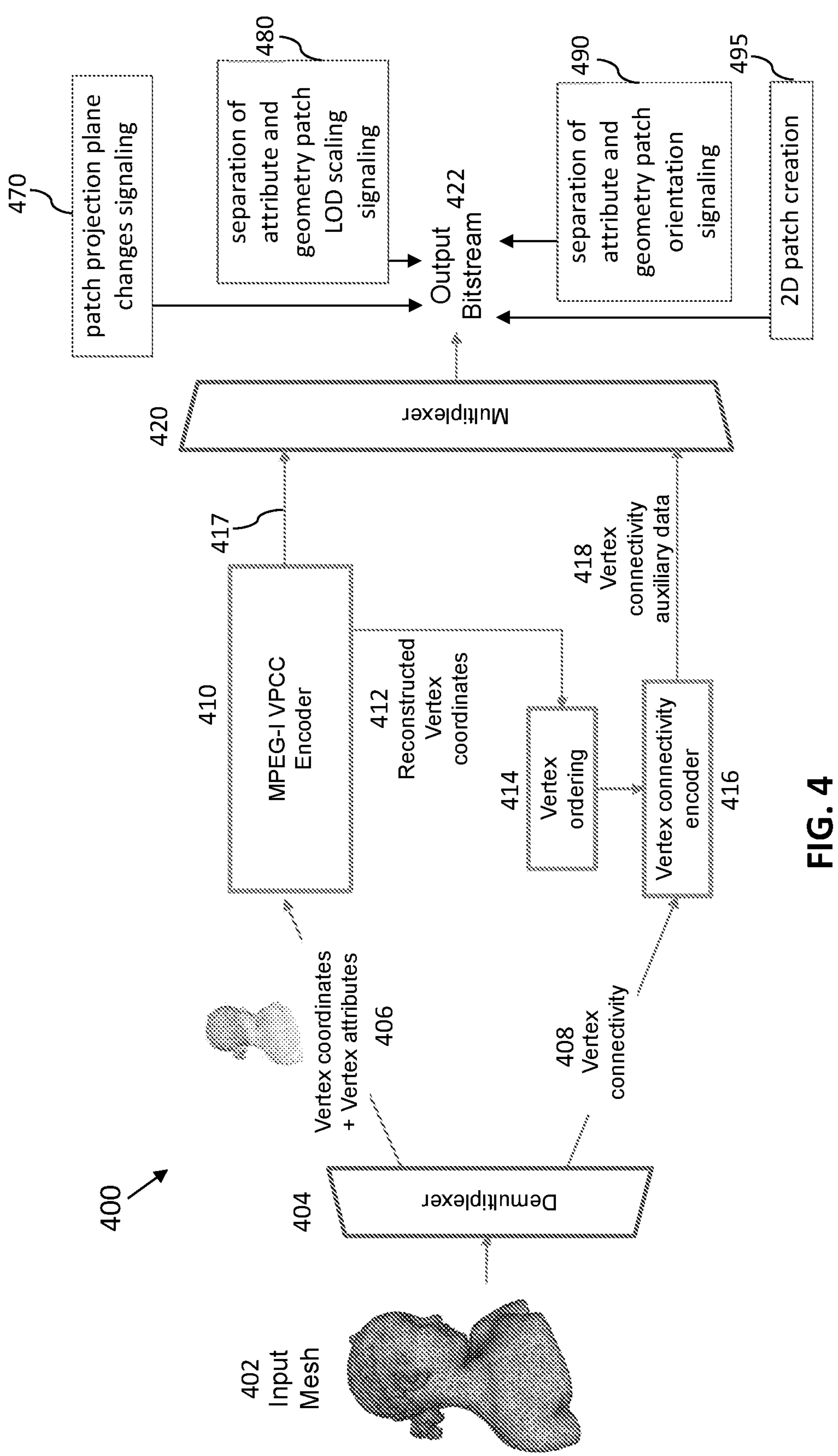
FIG. 4 shows an example V-PCC extension for mesh encoding, based on the embodiments described herein.
Figure 5:
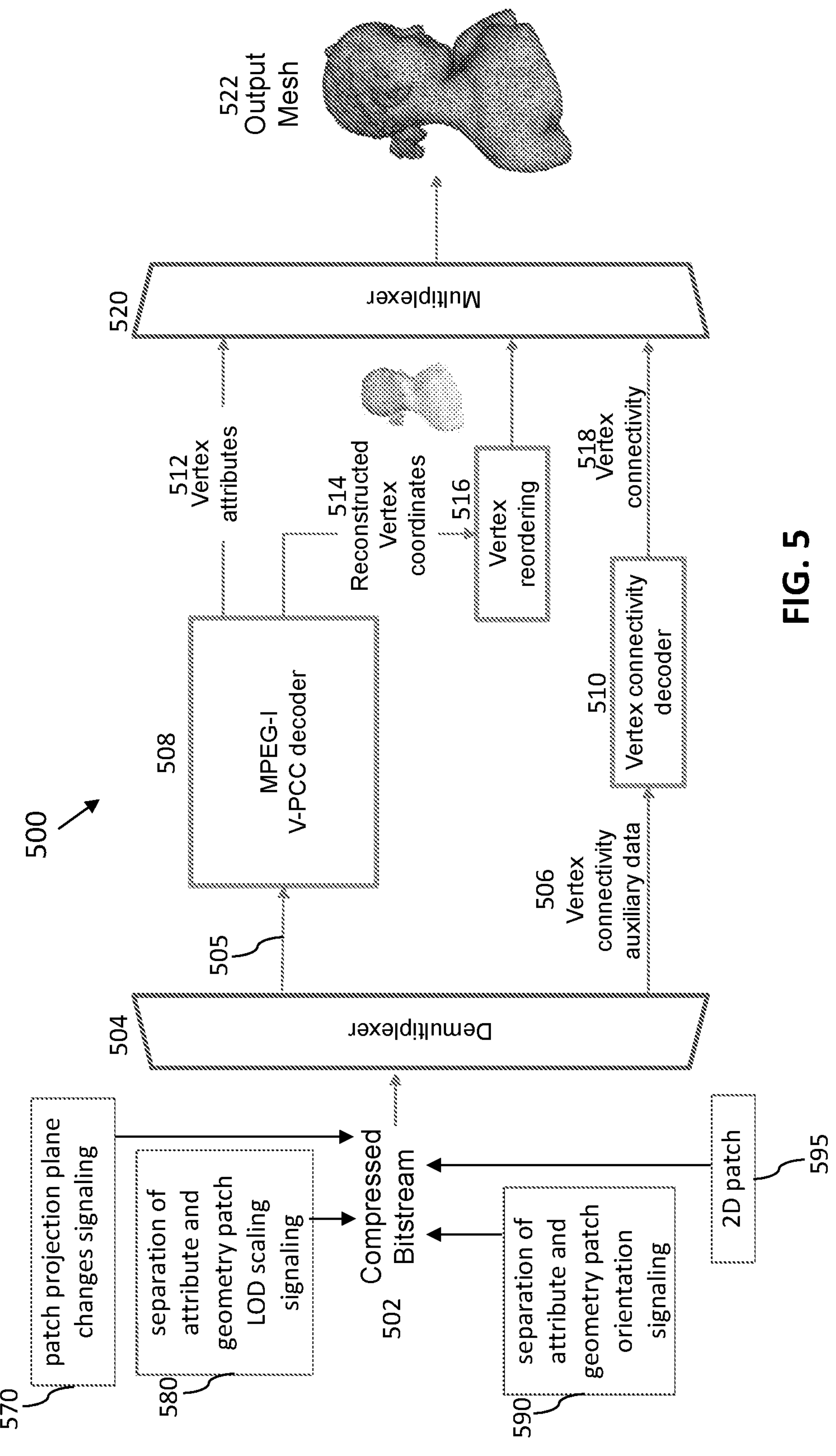
FIG. 5 shows an example V-PCC extension for mesh decoding, based on the embodiments described herein.

FIG. 4 and FIG. 5 show example extensions to the V-PCC encoder 400 and decoder 500 to support mesh encoding and mesh decoding, respectively.

In the encoder extension 400, the input mesh data 402 is demultiplexed 404 into vertex coordinate+attributes 406 and vertex connectivity 408. The vertex coordinate+attributes data 406 is coded 410 using MPEG-I V-PCC, whereas the vertex connectivity data 408 is coded (using vertex connectivity encoder 416) as auxiliary data 418. Both of these (encoded vertex coordinates and vertex attributes 417 and auxiliary data 418) are multiplexed 420 to create the final compressed output bitstream 422. Vertex ordering 414 is carried out on the reconstructed vertex coordinates 412 at the output of MPEG-I V-PCC 410 to reorder the vertices for optimal vertex connectivity encoding 416.

Based on the examples described herein, as shown in FIG. 4, the encoding process/apparatus 400 of FIG. 4 may be extended such that the encoding process/apparatus 400 signals projection plane changes 470, separation of attribute and geometry patch LOD scaling 480, and/or separation of attribute and geometry patch orientation 490. The projection plane changes signaling 470 signals changes within a patch to support patches wrapping around a 3D model. The separation of attribute and geometry patch LOD scaling signaling 480 supports high resolution attribute patches alongside lower resolution geometry patches, reflecting the nature of lower vertex count meshes. The separation of attribute and geometry patch orientation signaling 490 is for image packing (pdu_orientation_index) to improve video codec efficiency. Signaling 470, 480, and/or 490 may be a part of the output bitstream 422. Alternatively, signaling 470, signaling 480, and/or signaling 490 may be provided and signaled separately from the output bitstream 422.

Based on the examples described herein, as shown in FIG. 4, the encoding process/apparatus 400 of FIG. 4 may be extended such that the encoding process/apparatus 400 generates a 2D patch with operation 495. The 2D patch created using operation 495 may be provided within the output bitstream 422, or the 2D patch created using operation 495 may be signaled separately to a decoder.

In the decoder 500, the input bitstream 502 is demultiplexed 504 to generate the compressed bitstreams for vertex coordinates+attributes 505 and vertex connectivity 506. The input/compressed bitstream 502 may comprise or may be the output from the encoder 400, namely the output bitstream 422. The vertex coordinates+attributes 505 is decompressed using MPEG-I V-PCC decoder 508 to generate vertex attributes 512. Vertex ordering 516 is carried out on the reconstructed vertex coordinates 514 at the output of MPEG-I V-PCC decoder 508 to match the vertex at the encoder 400. The vertex connectivity data 506 is also decompressed using vertex connectivity decoder 510 to generate vertex connectivity 518, and everything (including vertex attributes 512, the output of vertex reordering 516, and vertex connectivity 518) is multiplexed 520 to generate the reconstructed mesh 522.

Based on the examples described herein, as shown in FIG. 5, the decoding process/apparatus 500 of FIG. 5 may be extended such that the decoding process/apparatus 500 receives signaling of projection plane changes 570, separation of attribute and geometry patch LOD scaling 580, and/or separation of attribute and geometry patch orientation 590. The projection plane changes signaling 570 signals changes within a patch to support patches wrapping around a 3D model. The separation of attribute and geometry patch LOD scaling signaling 580 supports high resolution attribute patches alongside lower resolution geometry patches, reflecting the nature of lower vertex count meshes. The separation of attribute and geometry patch orientation signaling 590 is for image packing (pdu_orientation_index) to improve video codec efficiency. Signaling 570, 580, and/or 590 may be a part of the compressed bitstream 502 or output bitstream 422. Alternatively, signaling 570, signaling 580, and/or signaling 590 may be received and signaled separately the compressed bitstream 502 or output bitstream 422.

As further shown in FIG. 5, the decoding process/apparatus 500 of FIG. 5 may be extended such that the decoding process/apparatus 500 receives a 2D patch 595 generated based on the examples described herein. The 2D patch 595 may be provided within compressed bitstream 502 or output bitstream 422, or the 2D patch 595 may be provided to the decoding process/apparatus 500 separately. The decoder 500 may also be configured to create the 2D patch 595.

Nokia Proposed Mesh Connectivity Coding (FI2020/5002)

In FI2020/5002, V-PCC is extended with additional attribute types to carry mesh connectivity information. The specific attribute types are edges, e.g. ATTR_EDGE, and edge prediction residuals, e.g. ATTR_EDGE_RES.

Mesh Texture Information

The current V-PCC mesh coding extension, as described in [MPEG M47608], assumes per-vertex attributes (mainly color) and a very high vertex count. In a way, it is a point cloud codec with added connectivity between points. However, often meshes consist of significant less vertices and carry along texture mapping information in form of a so called uv texture map (see FIG. 6).

Figure 6:
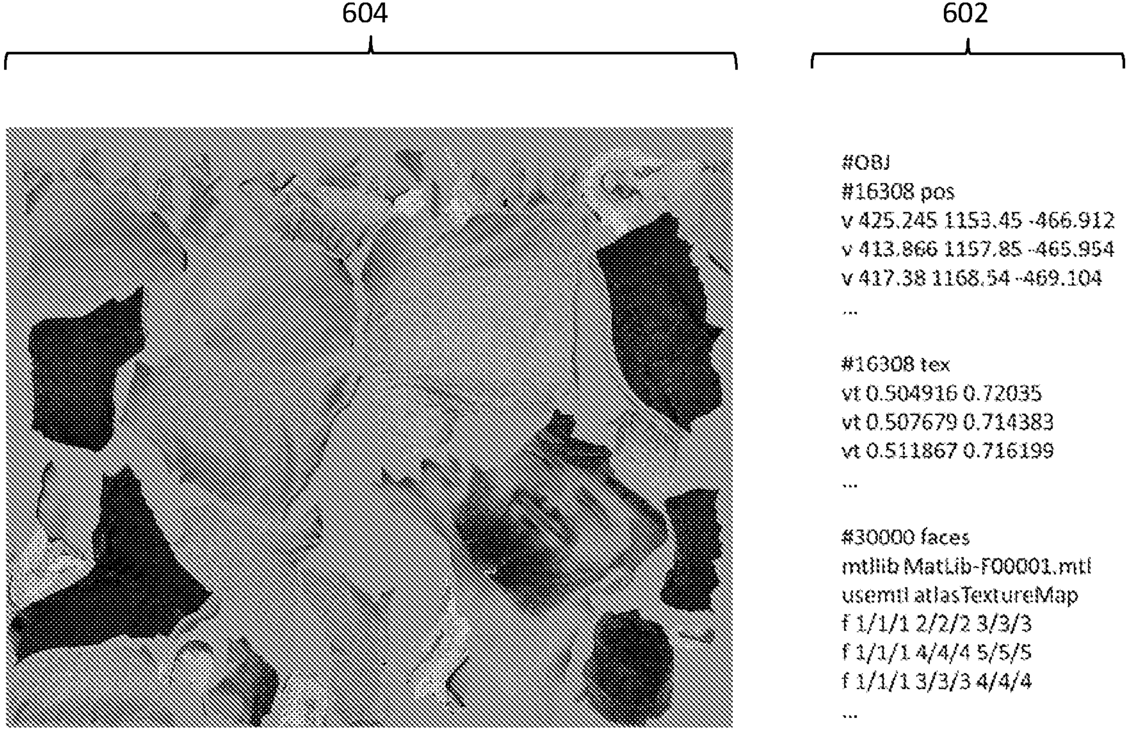
FIG. 6 shows an example of a mesh input (right) with associated texture map (left).

In particular, FIG. 6 shows an example of a mesh input (602) with associated texture map (604).

Such "parameterised" meshes carry mapping information for each vertex, indicating the corresponding uv coordinates in the associated texture map. In the mesh texturing process, the flat texture map is then wrapped around the 3D model according to the given vertex connections.

Nokia Proposed Texture Mapping for V-PCC Mesh Coding (FI2020/050818)

FI2020/050818 allows V-PCC mesh coding to utilize different resolution texture maps to enable low resolution geometry signaling with high resolution textures. The main benefit of FI2020/050818 is lower rendering complexity and bandwidth requirements with higher level of texture detail. The concepts are: i) Utilization of texture mapping in V-PCC mesh rendering, including Signaling of UV coordinates in V-PCC and as metadata structures (patch metadata and SEI), ii) As UV texture maps, and iii) Signaling of different size geometry and occupancy for V-PCC.

In the V3C framework, 2D patches are typically generated from the 3D model itself, thus requiring complex and computational heavy search operations in 3D space. The examples described herein simplify the 2D patch generation process by applying it to the 2D texture map instead of on the 3D model.

Furthermore, the current V3C framework does not support some beneficial flexibility in patch metadata signaling for dynamic mesh coding, in particular, V3C mandates:

- Constant projection plane within a patch (pdu_projection_id)
- Constant LOD scaling for texture and attribute patches (pdu_lod_scale_x_minus1 & pdu_lod_scale_y_idc)
- Constant patch packing in texture and attribute image (pdu_orientation_index)

Accordingly, the scope of the examples described herein is to apply UV mapping/Texture coordinates in V-PCC mesh coding extension and describe required signaling.

Described herein is an approach for fast and efficient 2D patch generation for parametrized meshes for further compression using the V3C framework.

Furthermore, the examples described herein disclose the required V3C based signaling to improve V3C mesh based compression, in particular: A. Signaling of projection plane changes within a patch to support patches wrapping around a 3D model; B. Separation of attribute and geometry patch LOD scaling signaling to support high resolution attribute patches alongside lower resolution geometry patches, reflecting the nature of lower vertex count meshes; C. Separation of attribute and geometry patch orientation signaling for image packing (pdu_orientation_index) to improve video coding efficiency.

1. 2D Patch Generation for Parametrized Meshes

Initially, mesh-based texture maps are not the same as V3C texture maps. Mesh-based texture maps are mapped to faces of the mesh using per vertex UV-coordinates. V3C texture maps are mapped to vertices per pixel. No face or UV information is needed.

However, mesh-based texture maps may be seen as preliminary V3C texture maps, but geometry maps would have a significantly smaller resolution (only the number of 3D vertices). Such mesh based texture maps together with the available vertex faces information provide a good first understanding of geometry complexity for patch generation and further encoding.

Taking as input a parametrized mesh 602 (see example in FIG. 6), the following process for 2D patch generation is disclosed, as pseudocode:

```
1.   Texture patch generation from texture map & face information:
       I. Start with 1st face from "pool of faces"
      II. Grow patch by iterating through connected faces: per vertex of current
          face, check any connected faces:
           a)  when ALL uv coordinates of the connected face vertices are in
               same texture patch, e.g.
                 by comparing 3D distances to uv coordinate difference
                 by analyzing the texture continuity between vertices of the
```

-continued

```
                    mesh on the texture map,
                    by analyzing face normals, the largest (x, y, z) component
                    of the normal vector needs to be mostly facing in the same
                    projection direction:
            b)  ADD face to current patch. REMOVE connected face from "pool
                of faces",
            else
            c)  Iterate (a) through all connected faces per vertex
            d)  Iterate (b) through all vertices of current patch
            e)  Iterate (c) through all added vertices
            end patch growing
      III. Iterate (II) through all remaining faces in "pool of faces"
2.    Geometry patch generation
      I. From (1) known are the UV-coordinates of vertices on the texture map
         (distance on the texture 2d and in space 3d as well as density), thus a
         subsampling (quantization) factor for the geometry map can be chosen
      II. Quantize vertices to (subsampled) geometry patch grid
         a)    3D->2D projection per projection plane (transform X&Y to u&v)
         b)    Write X, Y, Z offsets (per patch) as patch metadata
         c)    Write Z value as geometry pixel value
Create patch connectivity map, by going through each sample of the geometry patch, e.g.
according to FI2020/5002.
```

In one embodiment, the geometry subsampling factor is chosen based on one or more of the following characteristics: i) Patch size in x- or y-direction, ii) Number of vertices in the patch, iii) Overall patch resolution, iv) Patch content, e.g. a face detector identifying the patch content as a human face may lead to a lower subsampling to preserve detail, A combination of the above i-iv.

In one embodiment, the texture patch is redrawn (reprojected) after the geometry patch generation to ensure the correspondence of uv coordinates in the texture map with the new geometry patch, thus reducing projection and quantization errors in the final texture map. Such possible errors are visualized in FIG. 7.

FIG. 7 thus shows an example of geometry grid subsampling and resulting vertex texture errors. Shown are the original faces (702, several are shown), the geometry patch grid (704), the error vectors (706, several are shown in the left image and one error vector is shown in the right image), and new faces (708, several are shown).

In one embodiment, changes in dominant projection direction (pdu_projection_id) are allowed within a patch, the relevant signaling will be introduced in the next section.

In another embodiment, changes in dominant projection direction (pdu_projection_id) are disallowed, thus any changes in dominant projection direction will lead to the creation of a new patch.

In yet another embodiment, changes in dominant projection direction (pdu_projection_id) are allowed, the encoder can decide to either split the patch according to the above embodiment, or signal changes in dominant projection direction, according to the next section. The decision on whether to split the patch or not can be based on one or more of the following criteria: required bitrate for signaling, complexity of dominant projection direction changes, number of possible new patches created, total number of patches, etc.

2. V3C Signaling Embodiments

The examples described herein provide the following signaling syntax for V3C.

Embodiments 2.A—Signaling of Projection Plane Changes Within a Patch

The following signaling embodiments introduce the functionality of more than one dominant projection direction (pdu_projection_id) per patch.

In one embodiment, changes in dominant projection direction (pdu_projection_id) are signaled in steps, after a certain number of geometry values (pixel positions) and following a certain orientation and direction. Refer to FIG. 8, including item 802, and below.

| Patch data unit syntax | Descriptor |
|---|---|
| patch_data_unit( tileID, patchIdx ) { | |
| pdu_2d_pos_x[ tileID ][ patchIdx ] | ue(v) |
| pdu_2d_pos_y[ tileID ][ patchIdx ] | ue(v) |
| pdu_2d_size_x_minus1[ tileID ][ patchIdx ] | ue(v) |
| pdu_2d_size_y_minus1[ tileID ][ patchIdx ] | ue(v) |
| pdu_3d_offset_u[ tileID ][ patchIdx ] | u(v) |
| pdu_3d_offset_v[ tileID ][ patchIdx ] | u(v) |
| pdu_3d_offset_d[ tileID ][ patchIdx ] | u(v) |
| if( asps_normal_axis_max_delta_value_enabled_flag ) | |
| pdu_3d_range_d[ tileID ][ patchIdx ] | u(v) |
| pdu_projection_id[ tileID ][ patchIdx ] | u(v) |
| pdu_projection_id_change_flag[ tileID ][ patchIdx ] | u(1) |
| if( pdu_projection_id_change_flag ) { | |
| pdu_projection_id_change_direction[ tileID ][ patchIdx ] | u(2) |
| pdu_projection_id_change_step_size [ tileID ][ patchIdx ] | u(1) |
| pdu_projection_id_change_step_direction [ tileID ][ patchIdx ] | u(1) |

-continued

| Patch data unit syntax | |
|---|---|
| | Descriptor |
| pdu_projection_id_change_step_count [ tileID ][ patchIdx ] | ue(v) |
| for( i = 0; i < pdu_projection_id_change_step_count [ tileID ][ patchIdx ] + 1; i++ ) { | |
| pdu_projection_id_change_step [ tileID ][ patchIdx ] | ue(v) |
| } | |
| } | |
| pdu_orientation_index[ tileID ][ patchIdx ] | u(v) |
| if( afps_lod_mode_enabled_flag ) { | |
| pdu_lod_enabled_flag[ tileID ][ patchIdx ] | u(1) |
| if( pdu_lod_enabled_flag[ tileID ][ patchIdx ] ) { | |
| pdu_lod_scale_x_minus1[ tileID ][ patchIdx ] | ue(v) |
| pdu_lod_scale_y_idc[ tileID ][ patchIdx ] | ue(v) |
| } | |
| } | |
| if( asps_plr_enabled_flag ) | |
| plr_data( tileID, patchIdx ) | |
| if( asps_miv_extension_present_flag ) | |
| pdu_miv_extension( tileID, patchIdx ) /* Specified in ISO/IEC 23090-12 */ | |
| } | |

pdu_projection_id_change_flag[tileID][p] equal to 1 specifies that changes in projection plane id are present for the current patch p of the current atlas tile, with tile ID equal to tileID. When pdu_projection_id_change_flag[tileID][p] is equal to 0, no changes in projection plane id are for present the current patch. When pdu_projection_id_change_flag[tileID][p] is not present, its value shall be inferred to be equal to 0.

pdu_projection_id_change_direction specifies the direction in which the projection planes will be rotated. pdu_projection_id_change_direction equal to 0 indicates rotation clockwise around the x-axis. pdu_projection_id_change_direction equal to 1 indicates rotation clockwise around the y-axis. pdu_projection_id_change_direction equal to 2 indicates rotation counter-clockwise around the x-axis. pdu_projection_id_change_direction equal to zero indicates rotation counter-clockwise around the y-axis. When pdu_projection_id_change_direction[tileID][p] is not present, its value shall be inferred to be equal to 0.

pdu_projection_id_change_step_size specifies the step-size in which the projection planes will be rotated. pdu_projection_id_change_direction equal to 0 indicates 90 degree plane rotation. pdu_projection_id_change_direction equal to 1 indicates 45 degree plane rotation. When pdu_projection_id_change_step_size[tileID][p] is not present, its value shall be inferred to be equal to 0.

pdu_projection_id_change_step_direction specifies the direction in geometry patch coordinates for identifying projection id change steps. pdu_projection_id_change_step_direction equal to 0 indicates rotation clockwise around the x-axis. pdu_projection_id_change_step_direction equal to 1 indicates rotation clockwise around the y-axis.

pdu_projection_id_change_count specifies the number of rotation steps present. When pdu_projection_id_change_step_count[tileID][p] is not present, its value shall be inferred to be equal to 0.

pdu_projection_id_change_step indicates after how many geometry patch pixels, following pdu_projection_id_change_step_direction, a rotation in projection plane will occur be equal to 0.

In another embodiment, changes in dominant projection direction (pdu_projection_id) are signaled explicitly, after a certain number of geometry values (pixel positions), and following a certain orientation and direction. Refer to FIG. 9, including item 902, and below.

| Patch data unit syntax | |
|---|---|
| | Descriptor |
| patch_data_unit( tileID, patchIdx ) { | |
| pdu_2d_pos_x[ tileID ][ patchIdx ] | ue(v) |
| pdu_2d_pos_y[ tileID ][ patchIdx ] | ue(v) |
| pdu_2d_size_x_minus1[ tileID ][ patchIdx ] | ue(v) |
| pdu_2d_size_y_minus1[ tileID ][ patchIdx ] | ue(v) |
| pdu_3d_offset_u[ tileID ][ patchIdx ] | u(v) |
| pdu_3d_offset_v[ tileID ][ patchIdx ] | u(v) |
| pdu_3d_offset_d[ tileID ][ patchIdx ] | u(v) |
| if( asps_normal_axis_max_delta_value_enabled_flag ) | |
| pdu_3d_range_d[ tileID ][ patchIdx ] | u(v) |
| pdu_projection_id[ tileID ][ patchIdx ] | u(v) |
| pdu_projection_id_change_flag[ tileID ][ patchIdx ] | u(1) |
| if( pdu_projection_id_change_flag ) { | |
| pdu_projection_id_change_step_direction [ tileID ][ patchIdx ] | u(1) |
| pdu_projection_id_change_step_count [ tileID ][ patchIdx ] | ue(v) |
| for( i = 0; i < pdu_projection_id_change_step_count [ tileID ][ patchIdx ] + 1; i++ ) { | |

-continued

| Patch data unit syntax | |
|---|---|
| | Descriptor |
| pdu_projection_id_change_step [ tileID ][ patchIdx ] | ue(v) |
| pdu_projection_id[ tileID ][ patchIdx ] [i] | u(v) |
| } | |
| } | |
| pdu_orientation_index[ tileID ][ patchIdx ] | u(v) |
| if( afps_lod_mode_enabled_flag ) { | |
| pdu_lod_enabled_flag[ tileID ][ patchIdx ] | u(1) |
| if( pdu_lod_enabled_flag[ tileID ][ patchIdx ] ) { | |
| pdu_lod_scale_x_minus1[ tileID ][ patchIdx ] | ue(v) |
| pdu_lod_scale_y_idc[ tileID ][ patchIdx ] | ue(v) |
| } | |
| } | |
| if( asps_plr_enabled_flag ) | |
| plr_data( tileID, patchIdx ) | |
| if( asps_miv_extension_present_flag ) | |
| pdu_miv_extension( tileID, patchIdx ) /* Specified in ISO/IEC 23090-12 */ | |
| } | |

pdu_projection_id_change_flag[tileID][p] equal to 1 specifies that changes in projection plane id are present for the current patch p of the current atlas tile, with tile ID equal to tileID. When pdu_projection_id_change_flag[tileID][p] is equal to 0, no changes in projection plane id are present for the current patch. When pdu_projection_id_change_flag [tileID][p] is not present, its value shall be inferred to be equal to 0.

pdu_projection_id_change_step_direction specifies the direction in geometry patch coordinates for identifying projection id change steps. pdu_projection_id_change_step_direction equal to 0 indicates rotation clockwise around the x-axis. pdu_projection_id_change_step_direction equal to 1 indicates rotation clockwise around the y-axis.

pdu_projection_id_change_count specifies the number of rotation steps present. When pdu_projection_id_change_step_count[tileID][p] is not present, its value shall be inferred to be equal to 0.

pdu_projection_id_change_step indicates after how many geometry patch pixels, following pdu_projection_id_change_step_direction, a rotation in projection plane will occur be equal to 0.

In another embodiment, changes in dominant projection direction (pdu_projection_id), as well as patch 3D metadata, are signaled explicitly, after a certain number of geometry values (pixel positions), and following a certain orientation and direction. Refer to FIG. 10, including item 1002, and below.

| Patch data unit syntax | |
|---|---|
| | Descriptor |
| patch_data_unit( tileID, patchIdx ) { | |
| pdu_2d_pos_x[ tileID ][ patchIdx ] | ue(v) |
| pdu_2d_pos_y[ tileID ][ patchIdx ] | ue(v) |
| pdu_2d_size_x_minus1[ tileID ][ patchIdx ] | ue(v) |
| pdu_2d_size_y_minus1[ tileID ][ patchIdx ] | ue(v) |
| pdu_3d_offset_u[ tileID ][ patchIdx ] | u(v) |
| pdu_3d_offset_v[ tileID ][ patchIdx ] | u(v) |
| pdu_3d_offset_d[ tileID ][ patchIdx ] | u(v) |
| if( asps_normal_axis_max_delta_value_enabled_flag ) | |
| pdu_3d_range_d[ tileID ][ patchIdx ] | u(v) |
| pdu_projection_id[ tileID ][ patchIdx ] | u(v) |
| pdu_projection_id_change_flag[ tileID ][ patchIdx ] | u(1) |
| if( pdu_projection_id_change_flag ) { | |
| pdu_projection_id_change_step_direction [ tileID ][ patchIdx ] | u(1) |
| pdu_projection_id_change_step_count [ tileID ][ patchIdx ] | ue(v) |
| for( i = 0; i < pdu_projection_id_change_step_count [ tileID ][ patchIdx ] + 1; i++ ) { | |
| pdu_projection_id_change_step [ tileID ][ patchIdx ] | ue(v) |
| pdu_projection_id[ tileID ][ patchIdx ] [i] | u(v) |
| pdu_3d_offset_u[ tileID ][ patchIdx ] [i] | u(v) |
| pdu_3d_offset_v[ tileID ][ patchIdx ] [i] | u(v) |
| pdu_3d_offset_d[ tileID ][ patchIdx ] [i] | u(v) |
| if( asps_normal_axis_max_delta_value_enabled_flag ) | |
| pdu_3d_range_d[ tileID ][ patchIdx ] [i] | u(v) |
| } | |
| } | |
| pdu_orientation_index[ tileID ][ patchIdx ] | u(v) |
| if( afps_lod_mode_enabled_flag ) { | |
| pdu_lod_enabled_flag[ tileID ][ patchIdx ] | u(1) |
| if( pdu_lod_enabled_flag[ tileID ][ patchIdx ] ) { | |

-continued

| Patch data unit syntax | Descriptor |
|---|---|
| pdu_lod_scale_x_minus1[ tileID ][ patchIdx ] | ue(v) |
| pdu_lod_scale_y_idc[ tileID ][ patchIdx ] | ue(v) |
| } | |
| } | |
| if( asps_plr_enabled_flag ) | |
| plr_data( tileID, patchIdx ) | |
| if( asps_miv_extension_present_flag ) | |
| pdu_miv_extension( tileID, patchIdx ) /* Specified in ISO/IEC 23090-12 */ | |
| } | |

pdu_projection_id_change_flag[tileID][p] equal to 1 specifies that changes in projection plane id are present for the current patch p of the current atlas tile, with tile ID equal to tileID. When pdu_projection_id_change_flag[tileID][p] is equal to 0, no changes in projection plane id for are present the current patch. When pdu_projection_id_change_flag[tileID][p] is not present, its value shall be inferred to be equal to 0.

pdu_projection_id_change_step_direction specifies the direction in geometry patch coordinates for identifying projection id change steps. pdu_projection_id_change_step_direction equal to 0 indicates rotation clockwise around the x-axis. pdu_projection_id_change_step_direction equal to 1 indicates rotation clockwise around the y-axis.

pdu_projection_id_change_count specifies the number of rotation steps present. When pdu_projection_id_change_step_count[tileID][p] is not present, its value shall be inferred to be equal to 0.

pdu_projection_id_change_step indicates after how many geometry patch pixels, following pdu_projection_id_change_step_direction, a rotation in projection plane will occur be equal to 0.

Embodiment 2.B—Separation of Attribute and Geometry Patch LOD Scaling Signaling The introduced signaling supports the separation of texture and geometry LOD scaling per patch. Refer to FIG. 11, including items 1102 and 1104, and below.

| Patch data unit syntax | Descriptor |
|---|---|
| patch_data_unit( tileID, patchIdx ) { | |
| pdu_2d_pos_x[ tileID ][ patchIdx ] | ue(v) |
| pdu_2d_pos_y[ tileID ][ patchIdx ] | ue(v) |
| pdu_2d_size_x_minus1[ tileID ][ patchIdx ] | ue(v) |
| pdu_2d_size_y_minus1[ tileID ][ patchIdx ] | ue(v) |
| pdu_3d_offset_u[ tileID ][ patchIdx ] | u(v) |
| pdu_3d_offset_v[ tileID ][ patchIdx ] | u(v) |
| pdu_3d_offset_d[ tileID ][ patchIdx ] | u(v) |
| if( asps_normal_axis_max_delta_value_enabled_flag ) | |
| pdu_3d_range_d[ tileID ][ patchIdx ] | u(v) |
| pdu_projection_id[ tileID ][ patchIdx ] | u(v) |
| pdu_orientation_index[ tileID ][ patchIdx ] | u(v) |
| if( afps_lod_mode_enabled_flag ) { | |
| pdu_lod_enabled_flag[ tileID ][ patchIdx ] | u(1) |
| if( pdu_lod_enabled_flag[ tileID ][ patchIdx ] ) { | |
| pdu_lod_seperated_flag [ tileID ][ patchIdx ] | u(1) |
| pdu_lod_scale_x_minus1[ tileID ][ patchIdx ] | ue(v) |
| pdu_lod_scale_y_idc[ tileID ][ patchIdx ] | ue(v) |
| if( pdu_lod_enabled_flag[ tileID ][ patchIdx ] ) { | |
| pdu_lod_seperated_flag [ tileID ][ patchIdx ] | u(1) |

-continued

| Patch data unit syntax | Descriptor |
|---|---|
| pdu_lod_scale_tex_x_minus1[ tileID ][ patchIdx ] | ue(v) |
| pdu_lod_scale_tex_y_idc[ tileID ][ patchIdx ] | ue(v) |
| } | |
| } | |
| } | |
| if( asps_plr_enabled_flag ) | |
| plr_data( tileID, patchIdx ) | |
| if( asps_miv_extension_present_flag ) | |
| pdu_miv_extension( tileID, patchIdx ) /* Specified in ISO/IEC 23090-12 */ | |
| } | |

pdu_lod_scale_x_minus1[tileID][p] plus 1 specifies the LOD scaling factor to be applied to the local x coordinate of a point in a patch with index p of the current atlas tile, with tile ID equal to tileID, prior to its addition to the patch coordinate TilePatch3dOffsetU[tileID][p]. When pdu_lod_scale_x_minus1[tileID][p] is not present, its value shall be inferred to be equal to 0.]. When pdu_lod_seperated_flag [tileID][p] is present, its value shall be only applied to geometry patch(es).

pdu_lod_scale_y_idc[tileID][p] indicates the LOD scaling factor to be applied to the local y coordinate of a point in a patch with index p of the current atlas tile, with tile ID equal to tileID, prior to its addition to the patch coordinate TilePatch3dOffsetV[tileID][p]. When pdu_lod_scale_y_idc [tileID][p] is not present, its value shall be inferred to be equal to 0. When pdu_lod_seperated_flag[tileID][p] is present, its value shall be only applied to geometry patch(es).

pdu_lod_seperated_flag[tileID][p] equal to 1 specifies that separated LOD parameters are present for the current patch p of the current atlas tile, with tile ID equal to tileID. When pdu_lod_seperated_flag[tileID][p] is equal to 0, no separated LOD parameters are present for the current patch. When pdu_lod_enabled_flag[tileID][p] is not present, its value shall be inferred to be equal to 0.

pdu_lod_scale_tex_x_minus1[tileID][p] plus 1 specifies the LOD scaling factor to be applied to the local x coordinate of a point in an attribute patch with index p of the current atlas tile, with tile ID equal to tileID, prior to its addition to the patch coordinate TilePatch3dOffsetU[tileID][p]. When pdu_lod_scale_tex_x_minus1[tileID][p] is not present, its value shall be inferred to be equal to 0.

pdu_lod_scale_tex_y_idc[tileID][p] indicates the LOD scaling factor to be applied to the local y coordinate of a point in an attribute patch with index p of the current atlas tile, with tile ID equal to tileID, prior to its addition to the patch coordinate TilePatch3dOffsetV[tileID][p]. When pdu_lod_scale_tex_y_idc[tileID][p] is not present, its value shall be inferred to be equal to 0.

Embodiment 2.C—Separation of Attribute and Geometry Patch Orientation Signaling The introduced signaling supports the separation of texture and geometry patch orientation. Refer to FIG. 12, including item 1202, and below.

| Patch data unit syntax | Descriptor |
|---|---|
| patch_data_unit( tileID, patchIdx ) { | |
| pdu_2d_pos_x[ tileID ][ patchIdx ] | ue(v) |
| pdu_2d_pos_y[ tileID ][ patchIdx ] | ue(v) |
| pdu_2d_size_x_minus1[ tileID ][ patchIdx ] | ue(v) |
| pdu_2d_size_y_minus1[ tileID ][ patchIdx ] | ue(v) |
| pdu_3d_offset_u[ tileID ][ patchIdx ] | u(v) |
| pdu_3d_offset_v[ tileID ][ patchIdx ] | u(v) |
| pdu_3d_offset_d[ tileID ][ patchIdx ] | u(v) |
| if( asps_normal_axis_max_delta_value_enabled_flag ) | |
| pdu_3d_range_d[ tileID ][ patchIdx ] | u(v) |
| pdu_projection_id[ tileID ][ patchIdx ] | u(v) |
| pdu_orientation_index[ tileID ][ patchIdx ] | u(v) |
| pdu_orientation_seperated_flag [ tileID ][ patchIdx ] | u(1) |
| if( pdu_orientation_seperated_flag) | |
| pdu_orientation_tex_index[ tileID ][ patchIdx ] | u(v) |
| if( afps_lod_mode_enabled_flag ) { | |
| pdu_lod_enabled_flag[ tileID ][ patchIdx ] | u(1) |
| if( pdu_lod_enabled_flag[ tileID ][ patchIdx ] ) { | |
| pdu_lod_scale_x_minus1[ tileID ][ patchIdx ] | ue(v) |
| pdu_lod_scale_y_idc[ tileID ][ patchIdx ] | ue(v) |
| } | |
| } | |
| if( asps_plr_enabled_flag ) | |
| plr_data( tileID, patchIdx ) | |
| if( asps_miv_extension_present_flag ) | |
| pdu_miv_extension( tileID, patchIdx ) /* Specified in ISO/IEC 23090-12 */ | |
| } | |

pdu_orientation_index[tileID][p] specifies the patch orientation index, for the patch with index p of the current atlas tile, with tile ID equal to tileID, used to determine the transformation matrices, Ro and Rs, that are to be used to transform atlas coordinates of a patch to a local patch coordinate system denoted by coordinates (u, v), before conversion to 3D space coordinates. The number of bits used to represent pdu_orientation_index[tileID][p] is (asps_use_eight_orientations_flag?3:1). When pdu_lod_seperated_flag[tileID][p] is present, its value shall be only applied to geometry patch(es).

pdu_orientation_seperated_flag[tileID][p] equal to 1 specifies that separated orientation indices for attribute and geometry patches are present for the current patch p of the current atlas tile, with tile ID equal to tileID. When pdu_orientation_seperated_flag[tileID][p] is equal to 0, no separated orientation indices for attribute and geometry patches are present for the current patch. When pdu_orientation_seperated_flag[tileID][p] is not present, its value shall be inferred to be equal to 0.

pdu_orientation_tex_index[tileID][p] specifies the attribute patch orientation index, for the patch with index p of the current atlas tile, with tile ID equal to tileID, used to determine the transformation matrices, Ro and Rs, that are to be used to transform atlas coordinates of a patch to a local geometry patch coordinate system denoted by coordinates (u, v), before conversion to 3D space coordinates. The number of bits used to represent pdu_orientation_index[tileID][p] is (asps_use_eight_orientations_flag?3:1).

There are several advantages and technical effects of the examples described herein. The concepts disclosed/described herein provide: an improved 3D patch generation process for V3C dynamic mesh compression, increased compression efficiency for coding dynamic mesh data, and a lightweight solution based on an existing V3C framework.

Ideas herein may be contributed to standardization in MPEG-I 23090 Part 5 and Nokia's response to the upcoming SC29/WG7 Mesh Coding CfP.

Structures and concepts described herein may be included as normative text in a standard and as such any product claiming conformance may be considered as an adopter.

Figure 13:
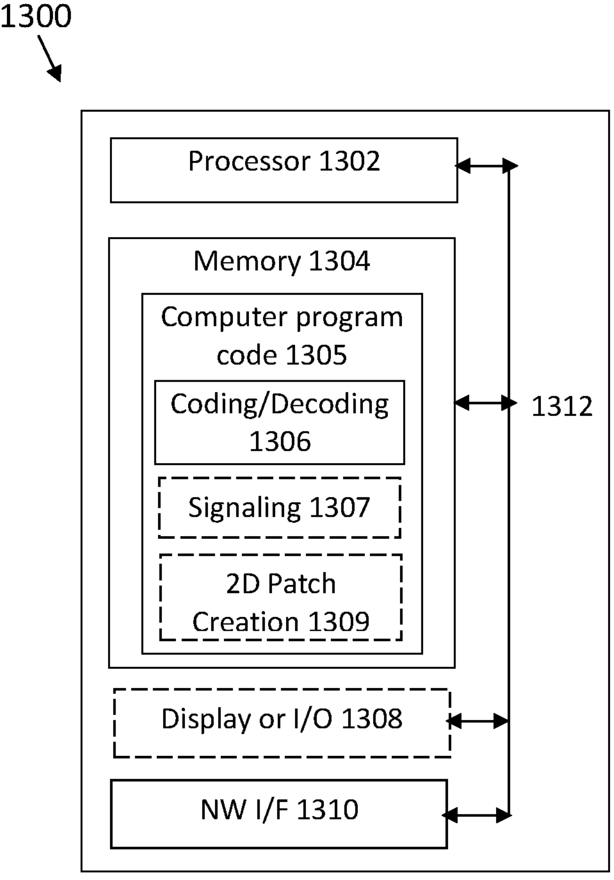
FIG. 13 is an example apparatus to implement patch creation and signaling for V3C dynamic mesh compression, based on the examples described herein.

FIG. 13 is an apparatus 1300 which may be implemented in hardware, configured to implement patch creation and signaling for V3C dynamic mesh compression, based on any of the examples described herein. The apparatus comprises a processor 1302, at least one memory 1304 (memory 1304 may for example be transitory or non-transitory) including computer program code 1305, wherein the at least one memory 1304 and the computer program code 1305 are configured to, with the at least one processor 1302, cause the apparatus to implement circuitry, a process, component, module, function, coding, and/or decoding (collectively 1306) to implement patch creation and signaling for V3C dynamic mesh compression, based on the examples described herein. The apparatus 1300 is optionally further configured to provide or receive signaling 1307, based on the signaling embodiments described herein. The apparatus 1300 is optionally further configured to create a 2D patch 1309, based on the 2D patch creation embodiments described herein. The apparatus 1300 optionally includes a display and/or I/O interface 1308 that may be used to display an output (e.g., an image or volumetric video) of a result of coding/decoding 1306. The display and/or I/O interface 1308 may also be configured to receive input such as user input (e.g. with a keypad). The apparatus 1300 also includes one or more network (NW) interfaces (I/F(s)) 1310. The NW I/F(s) 1310 may be wired and/or wireless and communicate over a channel or the Internet/other network(s) via any communication technique. The NW I/F(s) 1310 may comprise one or more transmitters and one or more receivers. The NW I/F(s) 1310 may comprise standard well-known components such as an amplifier, filter, frequency-converter, (de)modulator, and encoder/decoder circuitry(ies) and one or more antennas. In some examples, the processor 1302 is configured to implement item 1306 without use of memory 1304.

The apparatus 1300 may be a remote, virtual or cloud apparatus. The apparatus 1300 may be either a writer or a reader (e.g. parser), or both a writer and a reader (e.g. parser). The apparatus 1300 may be either a coder or a decoder, or both a coder and a decoder. The apparatus 1300 may be a user equipment (UE), a head mounted display (HMD), or any other fixed or mobile device.

The memory 1304 may be implemented using any suitable data storage technology, such as semiconductor based memory devices, flash memory, magnetic memory devices and systems, optical memory devices and systems, fixed memory and removable memory. The memory 1304 may comprise a database for storing data. Interface 1312 enables data communication between the various items of apparatus 1300, as shown in FIG. 13. Interface 1312 may be one or more buses, or interface 1312 may be one or more software interfaces configured to pass data within computer program code 1305. For example, the interface 1312 may be one or more buses such as address, data, or control buses, and may include any interconnection mechanism, such as a series of lines on a motherboard or integrated circuit, fiber optics or other optical communication equipment, and the like. In another example, interface 1312 is an object-oriented software interface. The apparatus 1300 need not comprise each of the features mentioned, or may comprise other features as well. The apparatus 1300 may be an embodiment of and have the features of any of the apparatuses shown in FIG. 2, FIG. 3, FIG. 4, and/or FIG. 5.

Figure 14:
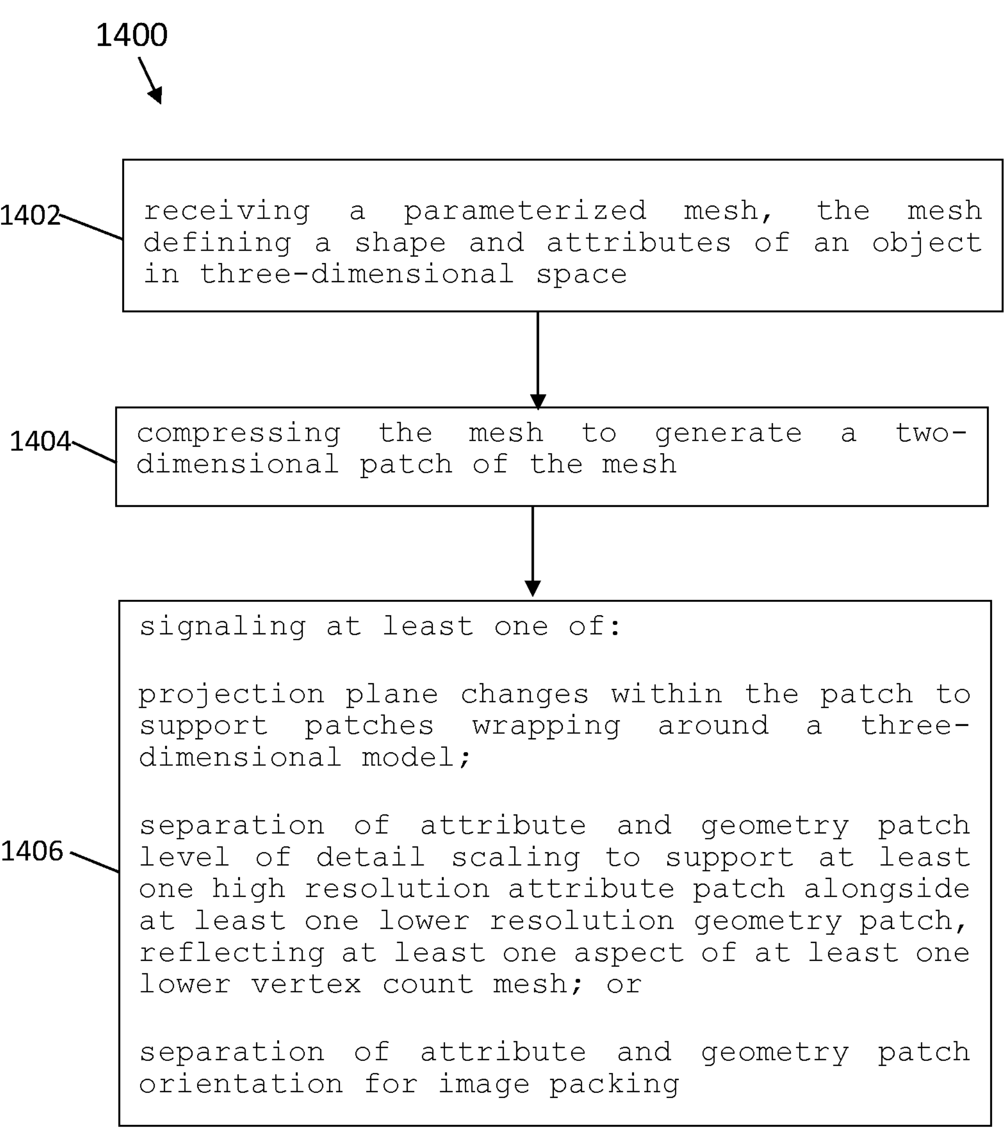
FIG. 14 is an example method to implement patch creation and signaling for V3C dynamic mesh compression, based on the examples described herein.

FIG. 14 is a method 1400 to implement patch creation and signaling for V3C dynamic mesh compression, based on the examples described herein. At 1402, the method includes receiving a parameterized mesh, the mesh defining a shape and attributes of an object in three-dimensional space. At 1404, the method includes compressing the mesh to generate a two-dimensional patch of the mesh. At 1406, the method includes signaling at least one of: projection plane changes within the patch to support patches wrapping around a three-dimensional model; separation of attribute and geometry patch level of detail scaling to support at least one high resolution attribute patch alongside at least one lower resolution geometry patch, reflecting at least one feature of at least one lower vertex count mesh; or separation of attribute and geometry patch orientation for image packing. Method 1400 may be implemented with apparatus 1300 or with an encoder apparatus.

Figure 15:
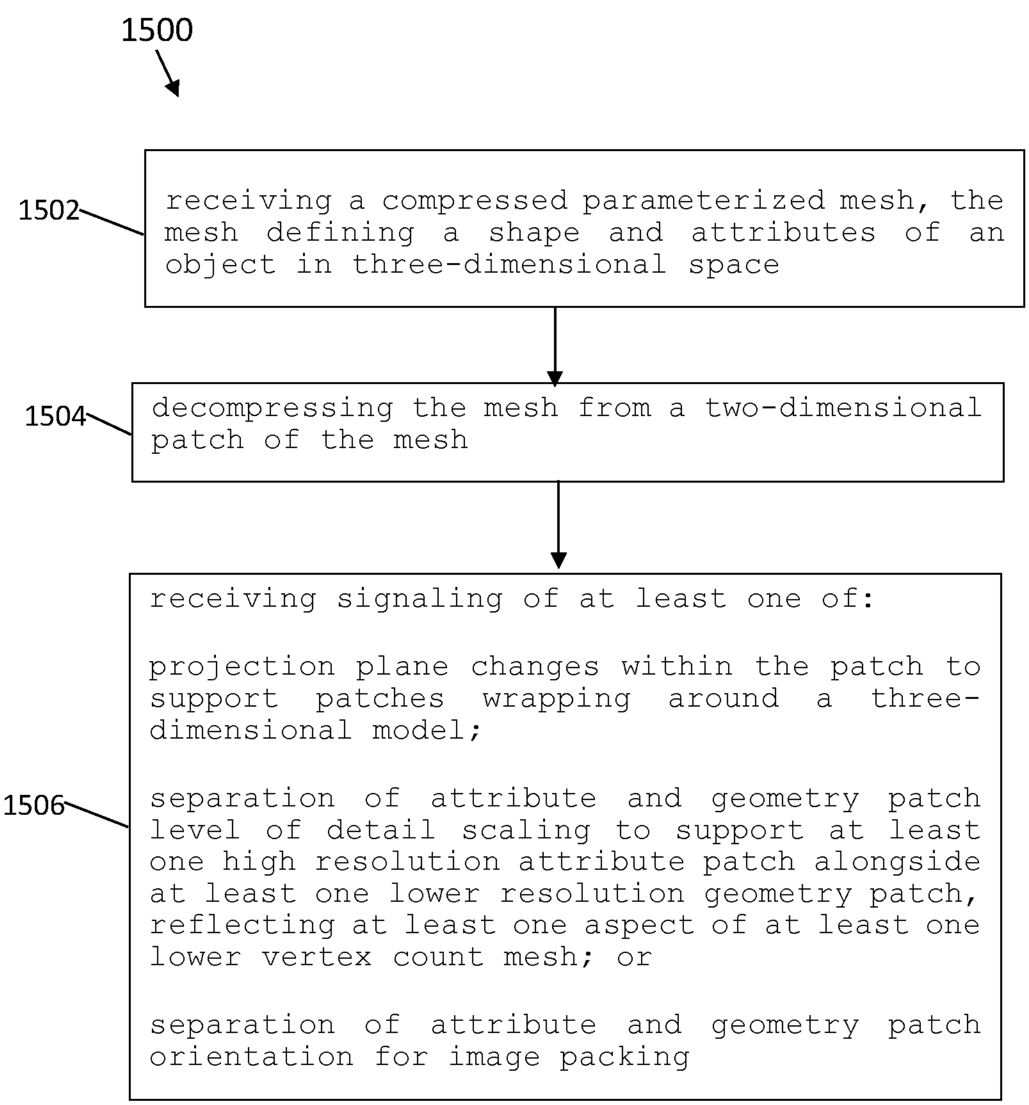
FIG. 15 is example method to implement patch creation and signaling for V3C dynamic mesh compression, based on the examples described herein.

FIG. 15 is a method 1500 to implement patch creation and signaling for V3C dynamic mesh compression, based on the examples described herein. At 1502, the method includes receiving a compressed parameterized mesh, the mesh defining a shape and attributes of an object in three-dimensional space. At 1504, the method includes decompressing the mesh from a two-dimensional patch of the mesh. At 1506, the method includes receiving signaling of at least one of: projection plane changes within the patch to support patches wrapping around a three-dimensional model; separation of attribute and geometry patch level of detail scaling to support at least one high resolution attribute patch alongside at least one lower resolution geometry patch, reflecting at least one feature of at least one lower vertex count mesh; or separation of attribute and geometry patch orientation for image packing. Method 1500 may be implemented with apparatus 1300 or with a decoder apparatus.

Figure 16:
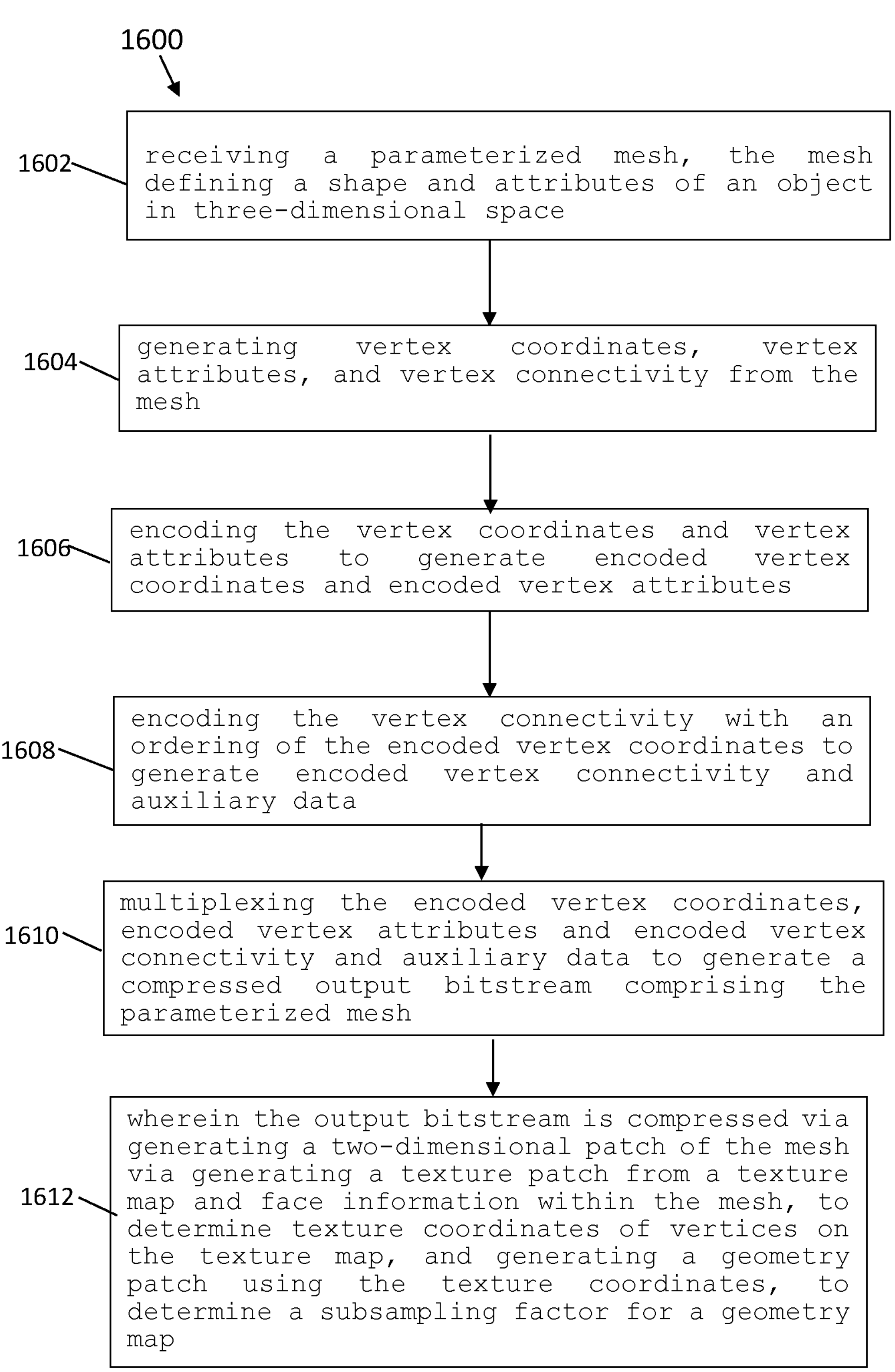
FIG. 16 is an example method to implement patch creation and signaling for V3C dynamic mesh compression, based on the examples described herein.

FIG. 16 is a method 1600 to implement patch creation and signaling for V3C dynamic mesh compression, based on the examples described herein. At 1602, the method includes receiving a parameterized mesh, the mesh defining a shape and attributes of an object in three-dimensional space. At 1604, the method includes generating vertex coordinates, vertex attributes, and vertex connectivity from the mesh. At 1606, the method includes encoding the vertex coordinates and vertex attributes to generate encoded vertex coordinates and encoded vertex attributes. At 1608, the method includes encoding the vertex connectivity with an ordering of the encoded vertex coordinates to generate encoded vertex connectivity and auxiliary data. At 1610, the method includes multiplexing the encoded vertex coordinates, encoded vertex attributes and encoded vertex connectivity and auxiliary data to generate a compressed output bitstream comprising the parameterized mesh. At 1612, the method includes wherein the output bitstream is compressed via generating a two-dimensional patch of the mesh via generating a texture patch from a texture map and face information within the mesh, to determine texture coordinates of vertices on the texture map, and generating a geometry patch using the texture coordinates, to determine a subsampling factor for a geometry map. Method 1600 may be implemented with apparatus 1300 or with an encoder apparatus such as that shown in FIG. 4.

Figure 17:
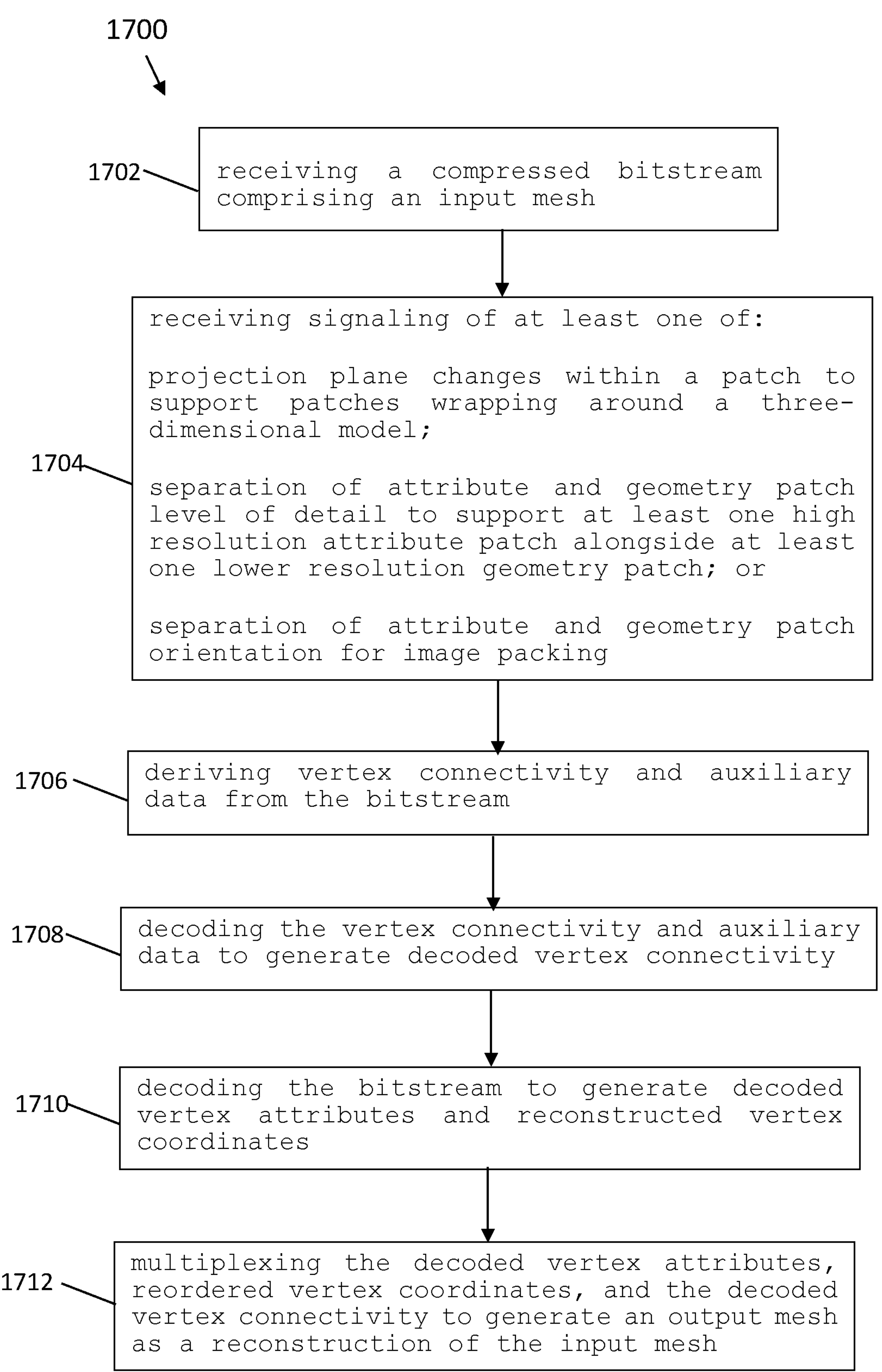
FIG. 17 is example method to implement patch creation and signaling for V3C dynamic mesh compression, based on the examples described herein.

FIG. 17 is a method 1700 to implement patch creation and signaling for V3C dynamic mesh compression, based on the examples described herein. At 1702, the method includes receiving a compressed bitstream comprising an input mesh. At 1704, the method includes receiving signaling of at least one of: projection plane changes within a patch to support patches wrapping around a three-dimensional model; separation of attribute and geometry patch level of detail to support at least one high resolution attribute patch alongside at least one lower resolution geometry patch; or separation of attribute and geometry patch orientation for image packing. At 1706, the method includes deriving vertex connectivity and auxiliary data from the bitstream. At 1708, the method includes decoding the vertex connectivity and auxiliary data to generate decoded vertex connectivity. At 1710, the method includes decoding the bitstream to generate decoded vertex attributes and reconstructed vertex coordinates. At 1712, the method includes multiplexing the decoded vertex attributes, reordered vertex coordinates, and the decoded vertex connectivity to generate an output mesh as a reconstruction of the input mesh. Method 1700 may be implemented with apparatus 1300 or with a decoder apparatus such as that shown in FIG. 5.

Figure 18:
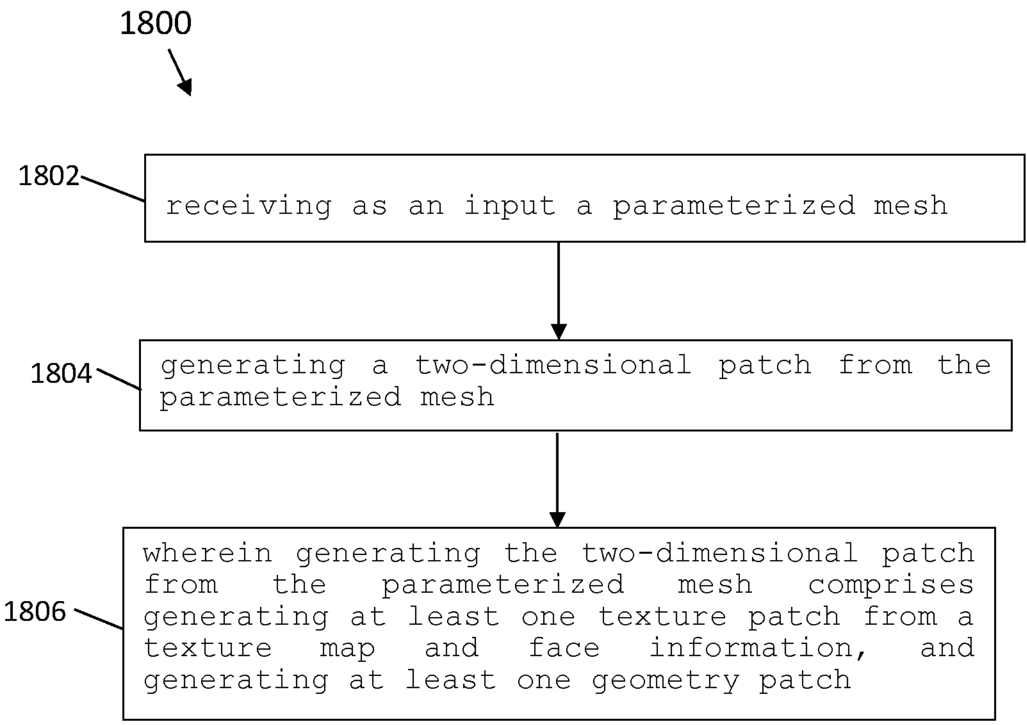
FIG. 18 is an example method for 2D patch generation for parameterized meshed for further compression using the V3C framework.

FIG. 18 is an example method 1800 for 2D patch generation for parameterized meshed for further compression using the V3C framework. At 1802, the method includes receiving as an input a parameterized mesh. At 1804, the method includes generating a two-dimensional patch from the parameterized mesh. At 1806, the method includes wherein generating the two-dimensional patch from the parameterized mesh comprises generating at least one texture patch from a texture map and face information, and generating at least one geometry patch. Method 1800 may be performed with apparatus 1300 or other encoder apparatus or decoder apparatus.

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, etc.

As used herein, the term 'circuitry' may refer to any of the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even when the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and when applicable to the particular element, a baseband integrated circuit or applications processor integrated circuit for a mobile phone or a similar integrated circuit in a server, a cellular network device, or another network device. Circuitry may also be used to mean a function or a process, such as one implemented by an encoder or decoder, or a codec.

An example method includes receiving a parameterized mesh, the mesh defining a shape and attributes of an object in three-dimensional space; compressing the mesh to generate a two-dimensional patch of the mesh; and signaling at least one of: projection plane changes within the patch to support patches wrapping around a three-dimensional model; separation of attribute and geometry patch level of detail scaling to support at least one high resolution attribute patch alongside at least one lower resolution geometry patch, reflecting at least one feature of at least one lower vertex count mesh; or separation of attribute and geometry patch orientation for image packing.

The method may further include wherein the compressing of the mesh to generate the two-dimensional patch of the mesh comprises: generating a texture patch from a texture map and face information within the mesh, to determine texture coordinates of vertices on the texture map; and generating a geometry patch using the texture coordinates, to determine a subsampling factor for a geometry map.

The method may further include wherein the geometry map subsampling factor is determined based on a patch size in x-direction.

The method may further include wherein the geometry map subsampling factor is determined based on a patch size in y-direction.

The method may further include wherein the geometry map subsampling factor is determined based on a number of vertices in a patch.

The method may further include wherein the geometry map subsampling factor is determined based on an overall patch resolution.

The method may further include wherein the geometry map subsampling factor is determined based on a content of a patch.

The method may further include wherein the geometry map subsampling factor is determined based on at least one of: a patch size in x-direction or y-direction; a number of vertices in a patch; an overall patch resolution; or a content of a patch.

The method may further include wherein the compressing of the mesh to generate the two-dimensional patch of the mesh comprises: reprojecting a texture patch after generating a geometry patch so that coordinate texture coordinates of a texture map correspond with the geometry patch.

The method may further include signaling changes in dominant projection direction within a patch.

The method may further include disallowing changes in dominant projection direction within a patch, such that changes in dominant projection direction lead to creation of a new patch.

The method may further include allowing changes in dominant projection direction within a patch.

The method may further include signaling the changes in the dominant projection direction.

The method may further include determining whether to split the patch.

The method may further include wherein determining whether to split the patch is based on at least one criterion comprising: a bitrate for signaling.

The method may further include wherein determining whether to split the patch is based on at least one criterion comprising: a complexity of the changes in dominant projection direction.

The method may further include wherein determining whether to split the patch is based on at least one criterion comprising: a number of possible new patches created.

The method may further include wherein determining whether to split the patch is based on at least one criterion comprising: a total number of patches.

The method may further include wherein determining whether to split the patch is based on at least one criterion comprising at least one of: a bitrate for signaling; a complexity of the changes in dominant projection direction; a number of possible new patches created; or a total number of patches.

The method may further include wherein the signaling of the projection plane changes within the patch to support patches wrapping around the three-dimensional model comprises: signaling dominant projection direction changes in steps, after a number of geometry values and following an orientation and direction.

The method may further include wherein the signaling of the projection plane changes within the patch to support patches wrapping around the three-dimensional model comprises: signaling dominant projection direction changes explicitly, after a number of geometry values and following an orientation and direction.

The method may further include wherein the signaling of the projection plane changes within the patch to support patches wrapping around the three-dimensional model comprises: signaling dominant projection direction changes and patch three-dimensional metadata explicitly, after a number of geometry values and following an orientation and direction.

The method may further include wherein the signaling of the projection plane changes within the patch to support patches wrapping around the three-dimensional model comprises at least one of: signaling dominant projection direction changes in steps, after a number of geometry values and following an orientation and direction; signaling dominant projection direction changes explicitly, after a number of geometry values and following an orientation and direction; or signaling dominant projection direction changes and patch three-dimensional metadata explicitly, after a number of geometry values and following an orientation and direction.

The method may further include wherein the signaling of the separation of attribute and geometry patch level of detail scaling to support at least one high resolution attribute patch alongside at least one lower resolution geometry patch, reflecting at least one feature of at least one lower vertex count mesh comprises: per patch signaling.

The method may further include wherein the signaling of the separation of attribute and geometry patch level of detail scaling to support at least one high resolution attribute patch alongside at least one lower resolution geometry patch, reflecting at least one feature of at least one lower vertex count mesh comprises: a flag that specifies whether separated level of detail parameters are present for a current patch of a current atlas tile.

The method may further include wherein the signaling of the separation of attribute and geometry patch level of detail scaling to support at least one high resolution attribute patch alongside at least one lower resolution geometry patch, reflecting at least one feature of at least one lower vertex count mesh comprises: a level of detail scaling factor to be applied to a local x-coordinate of a point in an attribute patch with an index of the current atlas tile.

The method may further include wherein the signaling of the separation of attribute and geometry patch level of detail scaling to support at least one high resolution attribute patch alongside at least one lower resolution geometry patch, reflecting at least one feature of at least one lower vertex count mesh comprises: a level of detail scaling factor to be applied to a local y-coordinate of a point in an attribute patch with the index of the current atlas tile.

The method may further include wherein the signaling of the separation of attribute and geometry patch level of detail scaling to support at least one high resolution attribute patch alongside at least one lower resolution geometry patch, reflecting at least one feature of at least one lower vertex count mesh comprises at least one of: per patch signaling; a flag that specifies whether separated level of detail parameters are present for a current patch of a current atlas tile; a level of detail scaling factor to be applied to a local x-coordinate of a point in an attribute patch with an index of the current atlas tile; or a level of detail scaling factor to be applied to a local y-coordinate of a point in an attribute patch with the index of the current atlas tile.

The method may further include wherein the signaling of the separation of attribute and geometry patch orientation for image packing comprises: a flag that specifies that separated orientation indices for attribute and geometry patches are present for a current patch of a current atlas tile; and an index that specifies an attribute patch orientation index, for a patch with an index of the current atlas tile.

An example method includes receiving a compressed parameterized mesh, the mesh defining a shape and attributes of an object in three-dimensional space; decompressing the mesh from a two-dimensional patch of the mesh; and receiving signaling of at least one of: projection plane changes within the patch to support patches wrapping around a three-dimensional model; separation of attribute and geometry patch level of detail scaling to support at least one high resolution attribute patch alongside at least one lower resolution geometry patch, reflecting at least one feature of at least one lower vertex count mesh; or separation of attribute and geometry patch orientation for image packing.

The method may further include compressing the mesh to generate the two-dimensional patch of the mesh, the compressing comprising: generating a texture patch from a texture map and face information within the mesh, to determine texture coordinates of vertices on the texture map; and generating a geometry patch using the texture coordinates, to determine a subsampling factor for a geometry map.

The method may further include wherein the geometry map subsampling factor is determined based on a patch size in x-direction.

The method may further include wherein the geometry map subsampling factor is determined based on a patch size in y-direction.

The method may further include wherein the geometry map subsampling factor is determined based on a number of vertices in a patch.

The method may further include wherein the geometry map subsampling factor is determined based on an overall patch resolution.

The method may further include wherein the geometry map subsampling factor is determined based on a content of a patch.

The method may further include wherein the geometry map subsampling factor is determined based on at least one of: a patch size in x-direction or y-direction; a number of vertices in a patch; an overall patch resolution; or a content of a patch.

The method may further include compressing the mesh to generate the two-dimensional patch of the mesh, the compressing comprising: reprojecting a texture patch after generating a geometry patch so that coordinate texture coordinates of a texture map correspond with the geometry patch.

The method may further include receiving signaling changes in dominant projection direction within a patch.

The method may further include disallowing changes in dominant projection direction within a patch, such that changes in dominant projection direction lead to creation of a new patch.

The method may further include allowing changes in dominant projection direction within a patch.

The method may further include signaling the changes in the dominant projection direction.

The method may further include determining whether to split the patch.

The method may further include wherein determining whether to split the patch is based on at least one criterion comprising: a bitrate for signaling.

The method may further include wherein determining whether to split the patch is based on at least one criterion comprising: a complexity of the changes in dominant projection direction.

The method may further include wherein determining whether to split the patch is based on at least one criterion comprising: a number of possible new patches created.

The method may further include wherein determining whether to split the patch is based on at least one criterion comprising: a total number of patches.

The method may further include wherein determining whether to split the patch is based on at least one criterion comprising at least one of: a bitrate for signaling; a complexity of the changes in dominant projection direction; a number of possible new patches created; or a total number of patches.

The method may further include wherein the signaling of projection plane changes within the patch to support patches wrapping around the three-dimensional model comprises: signaling of dominant projection direction changes in steps, after a number of geometry values and following an orientation and direction.

The method may further include wherein the signaling of projection plane changes within the patch to support patches wrapping around the three-dimensional model comprises: signaling of dominant projection direction changes explicitly, after a number of geometry values and following an orientation and direction.

The method may further include wherein the signaling of projection plane changes within the patch to support patches wrapping around the three-dimensional model comprises: signaling of dominant projection direction changes and patch three-dimensional metadata explicitly, after a number of geometry values and following an orientation and direction.

The method may further include wherein the signaling of projection plane changes within the patch to support patches wrapping around the three-dimensional model comprises at least one of: signaling of dominant projection direction changes in steps, after a number of geometry values and following an orientation and direction; signaling of dominant projection direction changes explicitly, after a number of geometry values and following an orientation and direction; or signaling of dominant projection direction changes and patch three-dimensional metadata explicitly, after a number of geometry values and following an orientation and direction.

The method may further include wherein the signaling of the separation of attribute and geometry patch level of detail scaling to support at least one high resolution attribute patch alongside at least one lower resolution geometry patch, reflecting at least one feature of at least one lower vertex count mesh comprises: per patch signaling.

The method may further include wherein the signaling of the separation of attribute and geometry patch level of detail scaling to support at least one high resolution attribute patch alongside at least one lower resolution geometry patch, reflecting at least one feature of at least one lower vertex count mesh comprises: a flag that specifies whether separated level of detail parameters are present for a current patch of a current atlas tile.

The method may further include wherein the signaling of the separation of attribute and geometry patch level of detail scaling to support at least one high resolution attribute patch alongside at least one lower resolution geometry patch, reflecting at least one feature of at least one lower vertex count mesh comprises: a level of detail scaling factor to be applied to a local x-coordinate of a point in an attribute patch with an index of the current atlas tile.

The method may further include wherein the signaling of the separation of attribute and geometry patch level of detail scaling to support at least one high resolution attribute patch alongside at least one lower resolution geometry patch, reflecting at least one feature of at least one lower vertex count mesh comprises: a level of detail scaling factor to be applied to a local y-coordinate of a point in an attribute patch with the index of the current atlas tile.

The method may further include wherein the signaling of the separation of attribute and geometry patch level of detail scaling to support at least one high resolution attribute patch alongside at least one lower resolution geometry patch, reflecting at least one feature of at least one lower vertex count mesh comprises at least one of: per patch signaling; a flag that specifies whether separated level of detail parameters are present for a current patch of a current atlas tile; a level of detail scaling factor to be applied to a local x-coordinate of a point in an attribute patch with an index of the current atlas tile; or a level of detail scaling factor to be applied to a local y-coordinate of a point in an attribute patch with the index of the current atlas tile.

The method may further include wherein the signaling of the separation of attribute and geometry patch orientation for image packing comprises: a flag that specifies that separated orientation indices for attribute and geometry patches are present for a current patch of a current atlas tile; and an index that specifies an attribute patch orientation index, for a patch with an index of the current atlas tile.

An example method includes receiving a parameterized mesh, the mesh defining a shape and attributes of an object in three-dimensional space; generating vertex coordinates, vertex attributes, and vertex connectivity from the mesh; encoding the vertex coordinates and vertex attributes to generate encoded vertex coordinates and encoded vertex attributes; encoding the vertex connectivity with an ordering of the encoded vertex coordinates to generate encoded vertex connectivity and auxiliary data; multiplexing the encoded vertex coordinates, encoded vertex attributes and encoded vertex connectivity and auxiliary data to generate a compressed output bitstream comprising the parameterized mesh; and wherein the output bitstream is compressed via generating a two-dimensional patch of the mesh via generating a texture patch from a texture map and face information within the mesh, to determine texture coordinates of vertices on the texture map, and generating a geometry patch using the texture coordinates, to determine a subsampling factor for a geometry map.

The method may further include signaling projection plane changes within the patch to support patches wrapping around a three-dimensional model.

The method may further include signaling separation of attribute and geometry patch level of detail to support at least one high resolution attribute patch alongside at least one lower resolution geometry patch.

The method may further include signaling separation of attribute and geometry patch orientation for image packing.

The method may further include signaling at least one of: projection plane changes within the patch to support patches wrapping around a three-dimensional model; separation of attribute and geometry patch level of detail to support at least one high resolution attribute patch alongside at least one lower resolution geometry patch; or separation of attribute and geometry patch orientation for image packing.

An example method includes receiving a compressed bitstream comprising an input mesh; receiving signaling of at least one of: projection plane changes within a patch to support patches wrapping around a three-dimensional model; separation of attribute and geometry patch level of detail to support at least one high resolution attribute patch alongside at least one lower resolution geometry patch; or separation of attribute and geometry patch orientation for image packing; deriving vertex connectivity and auxiliary data from the bitstream; decoding the vertex connectivity and auxiliary data to generate decoded vertex connectivity; decoding the bitstream to generate decoded vertex attributes and reconstructed vertex coordinates; and multiplexing the decoded vertex attributes, reordered vertex coordinates, and the decoded vertex connectivity to generate an output mesh as a reconstruction of the input mesh.

An example apparatus includes at least one processor; and at least one non-transitory memory including computer program code; wherein the at least one memory and the computer program code are configured to, with the at least one processor, cause apparatus at least to: receive a parameterized mesh, the mesh defining a shape and attributes of an object in three-dimensional space; compress the mesh to generate a two-dimensional patch of the mesh; and signal at least one of: projection plane changes within the patch to support patches wrapping around a three-dimensional model; separation of attribute and geometry patch level of detail scaling to support at least one high resolution attribute patch alongside at least one lower resolution geometry patch, reflecting at least one feature of at least one lower vertex count mesh; or separation of attribute and geometry patch orientation for image packing.

The apparatus may further include wherein the compressing of the mesh to generate the two-dimensional patch of the mesh comprises: generating a texture patch from a texture map and face information within the mesh, to determine texture coordinates of vertices on the texture map; and generating a geometry patch using the texture coordinates, to determine a subsampling factor for a geometry map.

The apparatus may further include wherein the geometry map subsampling factor is determined based on a patch size in x-direction.

The apparatus may further include wherein the geometry map subsampling factor is determined based on a patch size in y-direction.

The apparatus may further include wherein the geometry map subsampling factor is determined based on a number of vertices in a patch.

The apparatus may further include wherein the geometry map subsampling factor is determined based on an overall patch resolution.

The apparatus may further include wherein the geometry map subsampling factor is determined based on a content of a patch.

The apparatus may further include wherein the geometry map subsampling factor is determined based on at least one of: a patch size in x-direction or y-direction; a number of vertices in a patch; an overall patch resolution; or a content of a patch.

The apparatus may further include wherein the compressing of the mesh to generate the two-dimensional patch of the mesh comprises: reprojecting a texture patch after generating a geometry patch so that coordinate texture coordinates of a texture map correspond with the geometry patch.

The apparatus may further include wherein the at least one memory and the computer program code are further configured to, with the at least one processor, cause the apparatus at least to: signal changes in dominant projection direction within a patch.

The apparatus may further include wherein the at least one memory and the computer program code are further configured to, with the at least one processor, cause the apparatus at least to: disallow changes in dominant projection direction within a patch, such that changes in dominant projection direction lead to creation of a new patch.

The apparatus may further include wherein the at least one memory and the computer program code are further configured to, with the at least one processor, cause the apparatus at least to: allow changes in dominant projection direction within a patch.

The apparatus may further include wherein the at least one memory and the computer program code are further configured to, with the at least one processor, cause the apparatus at least to: signal the changes in the dominant projection direction.

The apparatus may further include wherein the at least one memory and the computer program code are further configured to, with the at least one processor, cause the apparatus at least to: determine whether to split the patch.

The apparatus may further include wherein determining whether to split the patch is based on at least one criterion comprising: a bitrate for signaling.

The apparatus may further include wherein determining whether to split the patch is based on at least one criterion comprising: a complexity of the changes in dominant projection direction.

The apparatus may further include wherein determining whether to split the patch is based on at least one criterion comprising: a number of possible new patches created.

The apparatus may further include wherein determining whether to split the patch is based on at least one criterion comprising: a total number of patches.

The apparatus may further include wherein determining whether to split the patch is based on at least one criterion comprising at least one of: a bitrate for signaling; a complexity of the changes in dominant projection direction; a number of possible new patches created; or a total number of patches.

The apparatus may further include wherein the signaling of the projection plane changes within the patch to support patches wrapping around the three-dimensional model comprises: signaling dominant projection direction changes in steps, after a number of geometry values and following an orientation and direction.

The apparatus may further include wherein the signaling of the projection plane changes within the patch to support patches wrapping around the three-dimensional model comprises: signaling dominant projection direction changes explicitly, after a number of geometry values and following an orientation and direction.

The apparatus may further include wherein the signaling of the projection plane changes within the patch to support patches wrapping around the three-dimensional model comprises: signaling dominant projection direction changes and patch three-dimensional metadata explicitly, after a number of geometry values and following an orientation and direction.

The apparatus may further include wherein the signaling of the projection plane changes within the patch to support patches wrapping around the three-dimensional model comprises at least one of: signaling dominant projection direction changes in steps, after a number of geometry values and following an orientation and direction; signaling dominant projection direction changes explicitly, after a number of geometry values and following an orientation and direction; or signaling dominant projection direction changes and patch three-dimensional metadata explicitly, after a number of geometry values and following an orientation and direction.

The apparatus may further include wherein the signaling of the separation of attribute and geometry patch level of detail scaling to support at least one high resolution attribute patch alongside at least one lower resolution geometry patch, reflecting at least one feature of at least one lower vertex count mesh comprises: per patch signaling.

The apparatus may further include wherein the signaling of the separation of attribute and geometry patch level of detail scaling to support at least one high resolution attribute patch alongside at least one lower resolution geometry patch, reflecting at least one feature of at least one lower vertex count mesh comprises: a flag that specifies whether separated level of detail parameters are present for a current patch of a current atlas tile.

The apparatus may further include wherein the signaling of the separation of attribute and geometry patch level of detail scaling to support at least one high resolution attribute patch alongside at least one lower resolution geometry patch, reflecting at least one feature of at least one lower vertex count mesh comprises: a level of detail scaling factor to be applied to a local x-coordinate of a point in an attribute patch with an index of the current atlas tile.

The apparatus may further include wherein the signaling of the separation of attribute and geometry patch level of detail scaling to support at least one high resolution attribute patch alongside at least one lower resolution geometry patch, reflecting at least one feature of at least one lower vertex count mesh comprises: a level of detail scaling factor to be applied to a local y-coordinate of a point in an attribute patch with the index of the current atlas tile.

The apparatus may further include wherein the signaling of the separation of attribute and geometry patch level of detail scaling to support at least one high resolution attribute patch alongside at least one lower resolution geometry patch, reflecting at least one feature of at least one lower vertex count mesh comprises at least one of: per patch signaling; a flag that specifies whether separated level of detail parameters are present for a current patch of a current atlas tile; a level of detail scaling factor to be applied to a local x-coordinate of a point in an attribute patch with an index of the current atlas tile; or a level of detail scaling factor to be applied to a local y-coordinate of a point in an attribute patch with the index of the current atlas tile.

The apparatus may further include wherein the signaling of the separation of attribute and geometry patch orientation for image packing comprises: a flag that specifies that separated orientation indices for attribute and geometry patches are present for a current patch of a current atlas tile; and an index that specifies an attribute patch orientation index, for a patch with an index of the current atlas tile.

An example apparatus includes at least one processor; and at least one non-transitory memory including computer program code; wherein the at least one memory and the computer program code are configured to, with the at least one processor, cause the apparatus at least to: receive a compressed parameterized mesh, the mesh defining a shape and attributes of an object in three-dimensional space; decompress the mesh from a two-dimensional patch of the mesh; and receive signaling of at least one of: projection plane changes within the patch to support patches wrapping around a three-dimensional model; separation of attribute and geometry patch level of detail scaling to support at least one high resolution attribute patch alongside at least one lower resolution geometry patch, reflecting at least one feature of at least one lower vertex count mesh; or separation of attribute and geometry patch orientation for image packing.

The apparatus may further include wherein the at least one memory and the computer program code are further configured to, with the at least one processor, cause the apparatus at least to: compress the mesh to generate the two-dimensional patch of the mesh, the compressing comprising: generating a texture patch from a texture map and face information within the mesh, to determine texture coordinates of vertices on the texture map; and generating a geometry patch using the texture coordinates, to determine a subsampling factor for a geometry map.

The apparatus may further include wherein the geometry map subsampling factor is determined based on a patch size in x-direction.

The apparatus may further include wherein the geometry map subsampling factor is determined based on a patch size in y-direction.

The apparatus may further include wherein the geometry map subsampling factor is determined based on a number of vertices in a patch.

The apparatus may further include wherein the geometry map subsampling factor is determined based on an overall patch resolution.

The apparatus may further include wherein the geometry map subsampling factor is determined based on a content of a patch.

The apparatus may further include wherein the geometry map subsampling factor is determined based on at least one of: a patch size in x-direction or y-direction; a number of vertices in a patch; an overall patch resolution; or a content of a patch.

The apparatus may further include wherein the at least one memory and the computer program code are further configured to, with the at least one processor, cause the apparatus at least to: compress the mesh to generate the two-dimensional patch of the mesh, the compressing comprising: reprojecting a texture patch after generating a geometry patch so that coordinate texture coordinates of a texture map correspond with the geometry patch.

The apparatus may further include wherein the at least one memory and the computer program code are further configured to, with the at least one processor, cause the apparatus at least to: receive signaling changes in dominant projection direction within a patch.

The apparatus may further include wherein the at least one memory and the computer program code are further configured to, with the at least one processor, cause the apparatus at least to: disallow changes in dominant projection direction within a patch, such that changes in dominant projection direction lead to creation of a new patch.

The apparatus may further include wherein the at least one memory and the computer program code are further configured to, with the at least one processor, cause the apparatus at least to: allow changes in dominant projection direction within a patch.

The apparatus may further include wherein the at least one memory and the computer program code are further configured to, with the at least one processor, cause the apparatus at least to: signal the changes in the dominant projection direction.

The apparatus may further include wherein the at least one memory and the computer program code are further configured to, with the at least one processor, cause the apparatus at least to: determine whether to split the patch.

The apparatus may further include wherein determining whether to split the patch is based on at least one criterion comprising: a bitrate for signaling.

The apparatus may further include wherein determining whether to split the patch is based on at least one criterion comprising: a complexity of the changes in dominant projection direction.

The apparatus may further include wherein determining whether to split the patch is based on at least one criterion comprising: a number of possible new patches created.

The apparatus may further include wherein determining whether to split the patch is based on at least one criterion comprising: a total number of patches.

The apparatus may further include wherein determining whether to split the patch is based on at least one criterion comprising at least one of: a bitrate for signaling; a complexity of the changes in dominant projection direction; a number of possible new patches created; or a total number of patches.

The apparatus may further include wherein the signaling of projection plane changes within the patch to support patches wrapping around the three-dimensional model comprises: signaling of dominant projection direction changes in steps, after a number of geometry values and following an orientation and direction.

The apparatus may further include wherein the signaling of projection plane changes within the patch to support patches wrapping around the three-dimensional model comprises: signaling of dominant projection direction changes explicitly, after a number of geometry values and following an orientation and direction.

The apparatus may further include wherein the signaling of projection plane changes within the patch to support patches wrapping around the three-dimensional model comprises: signaling of dominant projection direction changes and patch three-dimensional metadata explicitly, after a number of geometry values and following an orientation and direction.

The apparatus may further include wherein the signaling of projection plane changes within the patch to support patches wrapping around the three-dimensional model comprises at least one of: signaling of dominant projection direction changes in steps, after a number of geometry values and following an orientation and direction; signaling of dominant projection direction changes explicitly, after a number of geometry values and following an orientation and direction; or signaling of dominant projection direction changes and patch three-dimensional metadata explicitly, after a number of geometry values and following an orientation and direction.

The apparatus may further include wherein the signaling of the separation of attribute and geometry patch level of detail scaling to support at least one high resolution attribute patch alongside at least one lower resolution geometry patch, reflecting at least one feature of at least one lower vertex count mesh comprises: per patch signaling.

The apparatus may further include wherein the signaling of the separation of attribute and geometry patch level of detail scaling to support at least one high resolution attribute patch alongside at least one lower resolution geometry patch, reflecting at least one feature of at least one lower vertex count mesh comprises: a flag that specifies whether separated level of detail parameters are present for a current patch of a current atlas tile.

The apparatus may further include wherein the signaling of the separation of attribute and geometry patch level of detail scaling to support at least one high resolution attribute patch alongside at least one lower resolution geometry patch, reflecting at least one feature of at least one lower vertex count mesh comprises: a level of detail scaling factor to be applied to a local x-coordinate of a point in an attribute patch with an index of the current atlas tile.

The apparatus may further include wherein the signaling of the separation of attribute and geometry patch level of detail scaling to support at least one high resolution attribute patch alongside at least one lower resolution geometry patch, reflecting at least one feature of at least one lower vertex count mesh comprises: a level of detail scaling factor to be applied to a local y-coordinate of a point in an attribute patch with the index of the current atlas tile.

The apparatus may further include wherein the signaling of the separation of attribute and geometry patch level of detail scaling to support at least one high resolution attribute patch alongside at least one lower resolution geometry patch, reflecting at least one feature of at least one lower vertex count mesh comprises at least one of: per patch signaling; a flag that specifies whether separated level of detail parameters are present for a current patch of a current atlas tile; a level of detail scaling factor to be applied to a local x-coordinate of a point in an attribute patch with an index of the current atlas tile; or a level of detail scaling factor to be applied to a local y-coordinate of a point in an attribute patch with the index of the current atlas tile.

The apparatus may further include wherein the signaling of the separation of attribute and geometry patch orientation for image packing comprises: a flag that specifies that separated orientation indices for attribute and geometry patches are present for a current patch of a current atlas tile; and an index that specifies an attribute patch orientation index, for a patch with an index of the current atlas tile.

An example apparatus includes at least one processor; and at least one non-transitory memory including computer program code; wherein the at least one memory and the computer program code are configured to, with the at least one processor, cause the apparatus at least to: receive a parameterized mesh, the mesh defining a shape and attributes of an object in three-dimensional space; generate vertex coordinates, vertex attributes, and vertex connectivity from the mesh; encode the vertex coordinates and vertex attributes to generate encoded vertex coordinates and encoded vertex attributes; encode the vertex connectivity with an ordering of the encoded vertex coordinates to generate encoded vertex connectivity and auxiliary data; multiplex the encoded vertex coordinates, encoded vertex attributes and encoded vertex connectivity and auxiliary data to generate a compressed output bitstream comprising the parameterized mesh; and wherein the output bitstream is compressed via generating a two-dimensional patch of the mesh via generating a texture patch from a texture map and face information within the mesh, to determine texture coordinates of vertices on the texture map, and generating a geometry patch using the texture coordinates, to determine a subsampling factor for a geometry map.

The apparatus may further include wherein the at least one memory and the computer program code are further configured to, with the at least one processor, cause the apparatus at least to: signal projection plane changes within the patch to support patches wrapping around a three-dimensional model.

The apparatus may further include wherein the at least one memory and the computer program code are further configured to, with the at least one processor, cause the apparatus at least to: signal separation of attribute and geometry patch level of detail to support at least one high resolution attribute patch alongside at least one lower resolution geometry patch.

The apparatus may further include wherein the at least one memory and the computer program code are further configured to, with the at least one processor, cause the apparatus at least to: signal separation of attribute and geometry patch orientation for image packing.

The apparatus may further include wherein the at least one memory and the computer program code are further configured to, with the at least one processor, cause the apparatus at least to: signal at least one of: projection plane changes within the patch to support patches wrapping around a three-dimensional model; separation of attribute and geometry patch level of detail to support at least one high resolution attribute patch alongside at least one lower resolution geometry patch; or separation of attribute and geometry patch orientation for image packing.

An example apparatus includes at least one processor; and at least one non-transitory memory including computer program code; wherein the at least one memory and the computer program code are configured to, with the at least one processor, cause the apparatus at least to: receive a compressed bitstream comprising an input mesh; receive signaling of at least one of: projection plane changes within a patch to support patches wrapping around a three-dimensional model; separation of attribute and geometry patch level of detail to support at least one high resolution attribute patch alongside at least one lower resolution geometry patch; or separation of attribute and geometry patch orientation for image packing; derive vertex connectivity and auxiliary data from the bitstream; decode the vertex connectivity and auxiliary data to generate decoded vertex connectivity; decode the bitstream to generate decoded vertex attributes reconstructed vertex coordinates; and multiplex the decoded vertex attributes, reordered vertex coordinates, and the decoded vertex connectivity to generate an output mesh as a reconstruction of the input mesh.

An example apparatus includes means for receiving a parameterized mesh, the mesh defining a shape and attributes of an object in three-dimensional space; means for compressing the mesh to generate a two-dimensional patch of the mesh; and means for signaling at least one of: projection plane changes within the patch to support patches wrapping around a three-dimensional model; separation of attribute and geometry patch level of detail scaling to support at least one high resolution attribute patch alongside at least one lower resolution geometry patch, reflecting at least one feature of at least one lower vertex count mesh; or separation of attribute and geometry patch orientation for image packing.

The apparatus may further include one or more means for performing any of the methods as described herein.

An example apparatus includes means for receiving a compressed parameterized mesh, the mesh defining a shape and attributes of an object in three-dimensional space; means for decompressing the mesh from a two-dimensional patch of the mesh; and means for receiving signaling of at least one of: projection plane changes within the patch to support patches wrapping around a three-dimensional model; separation of attribute and geometry patch level of detail scaling to support at least one high resolution attribute patch alongside at least one lower resolution geometry patch, reflecting at least one feature of at least one lower vertex count mesh; or separation of attribute and geometry patch orientation for image packing.

The apparatus may further include one or more means for performing any of the methods as described herein.

An example apparatus includes means for receiving a parameterized mesh, the mesh defining a shape and attributes of an object in three-dimensional space; means for generating vertex coordinates, vertex attributes, and vertex connectivity from the mesh; means for encoding the vertex coordinates and vertex attributes to generate encoded vertex coordinates and encoded vertex attributes; means for encoding the vertex connectivity with an ordering of the encoded vertex coordinates to generate encoded vertex connectivity and auxiliary data; means for multiplexing the encoded vertex coordinates, encoded vertex attributes and encoded vertex connectivity and auxiliary data to generate a compressed output bitstream comprising the parameterized mesh; and wherein the output bitstream is compressed via generating a two-dimensional patch of the mesh via generating a texture patch from a texture map and face information within the mesh, to determine texture coordinates of vertices on the texture map, and generating a geometry patch using the texture coordinates, to determine a subsampling factor for a geometry map.

The apparatus may further include one or more means for performing any of the methods as described herein.

An example apparatus includes means for receiving a compressed bitstream comprising an input mesh; means for receiving signaling of at least one of: projection plane changes within a patch to support patches wrapping around a three-dimensional model; separation of attribute and geometry patch level of detail to support at least one high resolution attribute patch alongside at least one lower resolution geometry patch; or separation of attribute and geometry patch orientation for image packing; means for deriving vertex connectivity and auxiliary data from the bitstream; means for decoding the vertex connectivity and auxiliary data to generate decoded vertex connectivity; means for decoding the bitstream to generate decoded vertex attributes and reconstructed vertex coordinates; and means for multiplexing the decoded vertex attributes, reordered vertex coordinates, and the decoded vertex connectivity to generate an output mesh as a reconstruction of the input mesh.

An example non-transitory program storage device readable by a machine, tangibly embodying a program of instructions executable by the machine for performing operations is provided, the operations comprising: receiving a parameterized mesh, the mesh defining a shape and attributes of an object in three-dimensional space; compressing the mesh to generate a two-dimensional patch of the mesh; and signaling at least one of: projection plane changes within the patch to support patches wrapping around a three-dimensional model; separation of attribute and geometry patch level of detail scaling to support at least one high resolution attribute patch alongside at least one lower resolution geometry patch, reflecting at least one feature of at least one lower vertex count mesh; or separation of attribute and geometry patch orientation for image packing.

The operations of the non-transitory program storage device may further comprise any of the methods as described herein.

An example non-transitory program storage device readable by a machine, tangibly embodying a program of instructions executable by the machine for performing operations is provided, the operations comprising: receiving a compressed parameterized mesh, the mesh defining a shape and attributes of an object in three-dimensional space; decompressing the mesh from a two-dimensional patch of the mesh; and receiving signaling of at least one of: projection plane changes within the patch to support patches wrapping around a three-dimensional model; separation of attribute and geometry patch level of detail scaling to support at least one high resolution attribute patch alongside at least one lower resolution geometry patch, reflecting at least one feature of at least one lower vertex count mesh; or separation of attribute and geometry patch orientation for image packing.

The operations of the non-transitory program storage device may further comprise any of the methods as described herein.

An example non-transitory program storage device readable by a machine, tangibly embodying a program of instructions executable by the machine for performing operations is provided, the operations comprising: receiving a parameterized mesh, the mesh defining a shape and attributes of an object in three-dimensional space; generating vertex coordinates, vertex attributes, and vertex connectivity from the mesh; encoding the vertex coordinates and vertex attributes to generate encoded vertex coordinates and encoded vertex attributes; encoding the vertex connectivity with an ordering of the encoded vertex coordinates to generate encoded vertex connectivity and auxiliary data; multiplexing the encoded vertex coordinates, encoded vertex attributes and encoded vertex connectivity and auxiliary data to generate a compressed output bitstream comprising the parameterized mesh; and wherein the output bitstream is compressed via generating a two-dimensional patch of the mesh via generating a texture patch from a texture map and face information within the mesh, to determine texture coordinates of vertices on the texture map, and generating a geometry patch using the texture coordinates, to determine a subsampling factor for a geometry map.

The operations of the non-transitory program storage device may further comprise any of the methods as described herein.

An example non-transitory program storage device readable by a machine, tangibly embodying a program of instructions executable by the machine for performing operations is provided, the operations comprising: receiving a compressed bitstream comprising an input mesh; receiving signaling of at least one of: projection plane changes within a patch to support patches wrapping around a three-dimensional model; separation of attribute and geometry patch level of detail to support at least one high resolution attribute patch alongside at least one lower resolution geometry patch; or separation of attribute and geometry patch orientation for image packing; deriving vertex connectivity and auxiliary data from the bitstream; decoding the vertex connectivity and auxiliary data to generate decoded vertex connectivity; decoding the bitstream to generate decoded vertex attributes and reconstructed vertex coordinates; and multiplexing the decoded vertex attributes, reordered vertex coordinates, and the decoded vertex connectivity to generate an output mesh as a reconstruction of the input mesh.

An example apparatus includes at least one processor; and at least one memory including computer program code; wherein the at least one memory and the computer program code are configured to, with the at least one processor, cause the apparatus at least to: receive as an input a parameterized mesh; and generate a two-dimensional patch from the parameterized mesh; wherein generating the two-dimensional patch from the parameterized mesh comprises generating at least one texture patch from a texture map and face information, and generating at least one geometry patch.

The apparatus may further include wherein generating the at least one texture patch from the texture map and face information comprises: starting with a first face from a pool of faces; growing the texture patch with iterating through connected faces comprising: checking for connected faces per vertex of a current face; and iterating through remaining faces in the pool of faces following removal of a connected face of the connected faces from the pool of faces.

The apparatus may further include wherein growing the texture patch with iterating through connected faces further comprises: determining whether coordinate texture coordinates of connected face vertices are in a common texture patch; in response to the coordinate texture coordinates of connected face vertices being in a common texture patch, adding the current face to a current patch, and removing a connected face of the connected faces from the pool of faces; and in response to the coordinate texture coordinates of connected face vertices not being in a common texture patch: iterating the determining of whether coordinate texture coordinates of connected face vertices are in a common texture patch through connected faces per vertex; iterating the adding of the current face to the current patch through vertices of the current patch; and iterating the iterating of the determining of whether coordinate texture coordinates of connected face vertices are in a common texture patch through added vertices.

The apparatus may further include wherein the determining of whether coordinate texture coordinates of connected face vertices are in a common texture patch comprises at least one of: comparing three-dimensional distances to a coordinate texture coordinate difference; analyzing texture continuity between vertices of the mesh on the texture map; or analyzing at least one face normal, wherein a largest (x,y,z) component of a normal vector is constrained to be substantially facing in a common projection direction.

The apparatus may further include wherein generating the at least one geometry patch comprises: determining, from the generating of the at least one texture patch from the information, texture map and face coordinate texture coordinates of vertices on the texture map; selecting a subsampling factor or quantization factor for a geometry map, based on the coordinate texture coordinates of vertices on the texture map; quantizing vertices to a geometry patch grid; and creating a patch connectivity map, with traversing through at least one sample of the at least one geometry patch.

The apparatus may further include wherein the coordinate texture coordinates of vertices on the texture map comprise a distance on a two-dimensional texture, a distance in three-dimensional space, and density.

The apparatus may further include wherein the geometry patch grid has been subsampled.

The apparatus may further include wherein quantizing vertices to the geometry patch grid comprises: determining a three-dimensional to two-dimensional projection per projection plane; writing x-y-z offsets per patch as patch metadata; and writing a z-value as a geometry pixel value.

The apparatus may further include wherein the three-dimensional to two-dimensional projection is a transform from x-y coordinates to u-v coordinates.

The apparatus may further include wherein the subsampling factor for the geometry map is determined based on a patch size in x-direction.

The apparatus may further include wherein the subsampling factor for the geometry map is determined based on a patch size in y-direction.

The apparatus may further include wherein the subsampling factor for the geometry map is determined based on a number of vertices in a patch.

The apparatus may further include wherein the subsampling factor for the geometry map is determined based on an overall patch resolution.

The apparatus may further include wherein the subsampling factor for the geometry map is determined based on a content of a patch.

The apparatus may further include wherein the at least one memory comprises a non-transitory memory.

The apparatus may further include wherein the coordinate texture coordinates comprise uv coordinates.

The apparatus may further include wherein the coordinate texture coordinates comprise uv coordinates.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

The following acronyms and abbreviations that may be found in the specification and/or the drawing figures are defined as follows:

2D or 2d two-dimensional
3D or 3d three-dimensional
6DOF six degrees of freedom
ACL atlas coding layer
AR augmented reality
ASIC application-specific integrated circuit
asps atlas sequence parameter set
CGI computer-generated imagery
CVS coded V3C sequence
DIS Draft International Standard
HDR high dynamic range
HMD head mounted display
HRD hypothetical reference decoder
id or ID identifier
IEC International Electrotechnical Commission
I/F interface I/O input/output
ISO International Organization for Standardization
LOD level of detail
MIV MPEG immersive video
MPEG moving picture experts group
MPEG-I MPEG immersive
MR mixed reality
NAL or nal network abstraction layer
NW network
OBJ geometry definition file format (also .OBJ)
pos files including text descriptions of a position (also .POS)
RBSP raw byte sequence payload
SEI supplemental enhancement information
SODB string of data bits
u(n) unsigned integer using n bits, e.g. u(1), u(2)
UE user equipment
ue(v) unsigned integer exponential Golomb coded syntax element with the left bit first
UV or uv coordinate texture, where "U" or "u" and "V" or "v" are axes of a 2D texture
u(v) unsigned integer, where the number of bits is determined by the value of other syntax elements
V3C visual volumetric video-based coding
V-PCC video-based point cloud coding/compression
VPS V3C parameter set
VR virtual reality

What is claimed is:

1. A method comprising:

receiving a parameterized mesh, the mesh defining a shape and attributes of an object in three-dimensional space;

compressing the mesh to generate a two-dimensional patch of the mesh;

wherein the compressing of the mesh to generate the two-dimensional patch of the mesh comprises: generating a texture patch from a texture map and face information within the mesh, to determine texture coordinates of vertices on the texture map, and generating a geometry patch using the texture coordinates, to determine a subsampling factor for a geometry map;

signaling separation of attribute and geometry patch level of detail scaling to support at least one high resolution attribute patch alongside at least one lower resolution geometry patch, reflecting at least one feature of at least one lower vertex count mesh; and signaling at least one of:

projection plane changes within the patch to support patches wrapping around a three-dimensional model, or separation of attribute and geometry patch orientation for image packing.

2. The method of claim 1, wherein the geometry map subsampling factor is determined based on at least one of:

a patch size in x-direction or y-direction;

a number of vertices in a patch;

an overall patch resolution; or a content of a patch.

3. The method of claim 1, wherein the compressing of the mesh to generate the two-dimensional patch of the mesh comprises:

reprojecting a texture patch after generating a geometry patch so that coordinate texture coordinates of a texture map correspond with the geometry patch.

4. The method of claim 1, further comprising signaling changes in dominant projection direction within a patch.

5. The method of claim 1, further comprising disallowing changes in dominant projection direction within a patch, such that changes in the dominant projection direction lead to creation of a new patch.

6. A method comprising:

receiving a compressed parameterized mesh, the mesh defining a shape and attributes of an object in three-dimensional space;

decompressing the mesh from a two-dimensional patch of the mesh;

wherein the two-dimensional patch of the mesh has been generated by generating a texture patch from a texture map and face information within the mesh, to determine texture coordinates of vertices on the texture map, and generating a geometry patch using the texture coordinates, to determine a subsampling factor for a geometry map;

receiving signaling of separation of attribute and geometry patch level of detail scaling to support at least one high resolution attribute patch alongside at least one lower resolution geometry patch, reflecting at least one feature of at least one lower vertex count mesh; and receiving signaling of at least one of:

projection plane changes within the patch to support patches wrapping around a three-dimensional model, or separation of attribute and geometry patch orientation for image packing.

7. An apparatus comprising:

at least one processor; and at least one memory storing instructions that, when executed by the at least one processor, cause the apparatus at least to:

receive a parameterized mesh, the mesh defining a shape and attributes of an object in three-dimensional space;

compress the mesh to generate a two-dimensional patch of the mesh;

wherein the compressing of the mesh to generate the two-dimensional patch of the mesh comprises: generating a texture patch from a texture map and face information within the mesh, to determine texture coordinates of vertices on the texture map, and generating a geometry patch using the texture coordinates, to determine a subsampling factor for a geometry map;

signal separation of attribute and geometry patch level of detail scaling to support at least one high resolution attribute patch alongside at least one lower resolution geometry patch, reflecting at least one feature of at least one lower vertex count mesh; and signal at least one of:

projection plane changes within the patch to support patches wrapping around a three-dimensional model, or separation of attribute and geometry patch orientation for image packing.

8. The apparatus of claim 7, wherein the geometry map subsampling factor is determined based on at least one of:

a patch size in x-direction or y-direction;

a number of vertices in a patch;

an overall patch resolution; or a content of a patch.

9. The apparatus of claim 7, wherein the compressing of the mesh to generate the two-dimensional patch of the mesh comprises:

reprojecting a texture patch after generating a geometry patch so that coordinate texture coordinates of a texture map correspond with the geometry patch.

10. The apparatus of claim 7, wherein the at least one memory stores instructions that, when executed by the at least one processor, cause the apparatus at least to:

signal changes in dominant projection direction within a patch.

11. The apparatus of claim 7, wherein the at least one memory stores instructions that, when executed by the at least one processor, cause the apparatus at least to:

disallow changes in dominant projection direction within a patch, such that changes in the dominant projection direction lead to creation of a new patch.

12. The apparatus of claim 7, wherein the at least one memory stores instructions that, when executed by the at least one processor, cause the apparatus at least to:

allow changes in dominant projection direction within a patch.

13. The apparatus of claim 12, wherein the at least one memory stores instructions that, when executed by the at least one processor, cause the apparatus at least to:

signal the changes in the dominant projection direction.

14. The apparatus of claim 12, wherein the at least one memory stores instructions that, when executed by the at least one processor, cause the apparatus at least to:

determine whether to split the patch.

15. The apparatus of claim 14, wherein determining whether to split the patch is based on at least one criterion comprising at least one of:

a bitrate for signaling;

a complexity of the changes in the dominant projection direction;

a number of possible new patches created; or a total number of patches.

16. The apparatus of claim 7, wherein the signaling of the projection plane changes within the patch to support patches wrapping around the three-dimensional model comprises at least one of:

signaling dominant projection direction changes in steps, after a number of geometry values and following an orientation and direction;

signaling dominant projection direction changes explicitly, after a number of geometry values and following an orientation and direction; or signaling dominant projection direction changes and patch three-dimensional metadata explicitly, after a number of geometry values and following an orientation and direction.

17. The apparatus of claim 7, wherein the signaling of the separation of attribute and geometry patch level of detail scaling to support the at least one high resolution attribute patch alongside the at least one lower resolution geometry patch, reflecting the at least one feature of at least one lower vertex count mesh comprises at least one of:

per patch signaling;

a flag that specifies whether separated level of detail parameters are present for a current patch of a current atlas tile;

a level of detail scaling factor to be applied to a local x-coordinate of a point in an attribute patch with an index of the current atlas tile; or a level of detail scaling factor to be applied to a local y-coordinate of the point in the attribute patch with the index of the current atlas tile.

18. An apparatus comprising:

at least one processor; and at least one memory storing instructions that, when executed by the at least one processor, cause the apparatus at least to:

receive a compressed parameterized mesh, the mesh defining a shape and attributes of an object in three-dimensional space;

decompress the mesh from a two-dimensional patch of the mesh;

wherein the two-dimensional patch of the mesh has been generated by generating a texture patch from a texture map and face information within the mesh, to determine texture coordinates of vertices on the texture map, and generating a geometry patch using the texture coordinates, to determine a subsampling factor for a geometry map;

receive signaling of separation of attribute and geometry patch level of detail scaling to support at least one high resolution attribute patch alongside at least one lower resolution geometry patch, reflecting at least one feature of at least one lower vertex count mesh; and receive signaling of at least one of:

projection plane changes within the patch to support patches wrapping around a three-dimensional model, or separation of attribute and geometry patch orientation for image packing.

* * * * *